US011840586B2

(12) United States Patent
Appelhans et al.

(10) Patent No.: US 11,840,586 B2
(45) Date of Patent: Dec. 12, 2023

(54) USE OF LATENT METATHESIS POLYMERIZATION SYSTEMS FOR ADDITIVE MANUFACTURING

(71) Applicant: National Technology & Engineering Solutions of Sandia, LLC, Albuquerque, NM (US)

(72) Inventors: Leah Appelhans, Tijeras, NM (US); Samuel Leguizamon, Albuquerque, NM (US); Brad Howard Jones, Albuquerque, NM (US); Adam Wade Cook, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 103 days.

(21) Appl. No.: 17/677,558

(22) Filed: Feb. 22, 2022

(65) Prior Publication Data

US 2022/0282017 A1     Sep. 8, 2022

Related U.S. Application Data

(60) Provisional application No. 63/158,138, filed on Mar. 8, 2021.

(51) Int. Cl.

| | | |
|---|---|---|
| C08F 2/46 | (2006.01) | |
| C08F 2/50 | (2006.01) | |
| C08G 61/04 | (2006.01) | |
| C08F 236/20 | (2006.01) | |
| C09D 147/00 | (2006.01) | |
| B33Y 10/00 | (2015.01) | |
| B29C 64/124 | (2017.01) | |
| B33Y 40/20 | (2020.01) | |
| B33Y 70/00 | (2020.01) | |
| B29K 105/00 | (2006.01) | |

(52) U.S. Cl.
CPC .......... *C08F 236/20* (2013.01); *B29C 64/124* (2017.08); *B33Y 10/00* (2014.12); *B33Y 40/20* (2020.01); *B33Y 70/00* (2014.12); *C09D 147/00* (2013.01); *B29K 2105/0002* (2013.01)

(58) Field of Classification Search
CPC ......... B33Y 10/00; B33Y 40/20; B33Y 40/00; B33Y 70/00; C08F 236/20; B29K 2105/0002; B29C 64/124; B29C 64/106; C09D 147/00
USPC ........................ 522/184, 1, 6, 189, 71; 520/1
See application file for complete search history.

(56) References Cited

U.S. PATENT DOCUMENTS

| | | | |
|---|---|---|---|
| 9,370,404 B2 * | 6/2016 | Velamakanni | ....... A61C 13/087 |
| 11,142,662 B2 | 10/2021 | Burtovyy et al. | |
| 11,230,624 B2 | 1/2022 | Burtovyy et al. | |
| 2017/0306171 A1 * | 10/2017 | Vidavsky | ................. B01J 37/34 |
| 2021/0221931 A1 | 7/2021 | Burtovyy et al. | |

FOREIGN PATENT DOCUMENTS

WO     WO2021072206 A1     4/2021

OTHER PUBLICATIONS

Leguizamon, S. et al., "Employing Photosensitizers for Rapid Olefin Metathesis Additive Manufacturing of Poly (dicyclopentadiene)," Chemistry of Materials, 2021, vol. 33, pp. 9677-9689.

Robertson, I. D. et al., "Alkyl Phosphite Inhibitors for Frontal Ring-Opening Methathesis Polimerization Greatly Increase Pot Life," ACS Macro Letters, 2017, vol. 6, pp. 609-612.

Suslick, B. A. et al., "Survey of Catalysts for Frontal Ring-Opening Metathesis Polymerization," Macromolecules, 2021, vol. 54, pp. 5117-5123.

Dean, L. M. et al., "Photothermal Initiation of Frontal Polymerization Using Carbon Nanoparticles," ACS Applied Polymer Materials, 2020, vol. 2, pp. 4690-4696.

Stawiasz, K. J. et al., "Photoexcitation of Grubbs' Second-Generation Catalyst Initiates Frontal Ring-Opening Metathesis Polymerization," ACS Macro Letters, 2020, vol. 9, pp. 1563-1568.

Robertson, I. D. et al., "Rapid Energy-Efficient Manufacturing of Polymers and Composites via Frontal Polymerization," Nature, 2018, vol. 557, 12 pages.

Theunissen, C. et al., "Visible-Light-Controlled Ruthenium-Catalyzed Olefin Metathesis," Journal of the American Chemical Society, 2019, vol. 141, pp. 6791-6796.

Eivgi, O. et al. "Light-Activated Olefin Metathesis: Catalyst Development, Synthesis, and Applications," Accounts of Chemical Research, 2020, vol. 53, pp. 2456-2471.

(Continued)

*Primary Examiner* — Jessica Whiteley
(74) *Attorney, Agent, or Firm* — Kevin W. Bieg

(57) ABSTRACT

The invention is directed to latent metathesis-active resin compositions and additive manufacturing approaches. The latent metathesis-active compositions comprise at least one latent metathesis catalyst, at least one curable metathesis-active monomer, and optional fillers, photosensitizers, and/or a secondary monomer resin system for dual-cure. A method comprises extruding a latent metathesis-active resin from a dispensing apparatus and spatially triggering a ring-opening metathesis polymerization by directed irradiation with light or directed application of a thermal stimuli for direct-ink write printing of objects. Another method uses a latent metathesis-active resin for vat photopolymerization and stereolithographic printing of objects.

29 Claims, 14 Drawing Sheets

(56) References Cited

OTHER PUBLICATIONS

Eivgi, O. and Lemkoff, N. G., "Turning the Light On: Recent Developments in Photoinduced Olefin Metathesis," Synthesis, 2018, vol. 50, pp. 49-63.

Joo, W. et al., "Photoinitiated Ring-Opening Metathesis Polymerization," Journal of Polymer Science, Part A: Polymer Chemistry, 2019, vol. 57, 1791-1795.

Keitz, B. K. and Grubbs, R. H., "A Tandem Approach to Photoactivated Olefin Metathesis: Combining a Photoacid Generator with an Acid Activated Catalyst," Journal of American Chemical Society, 2009, vol. 131, pp. 2038-2039.

Pinaud, J. et al., "In Situ Generated Ruthenium-Arene Catalyst for Photoactivated Ring-Opening Metathesis Polymerization through Photolatent N-Heterocyclic Carbene Ligand," Chemistry a European Journal, 2018, vol. 24, pp. 337-341.

Chang, S. et al., "Synthesis and Characterization of New Ruthenium-Based Olefin Metathesis Catalysts Coordinated with Bidentate Schiff-Base Ligands," Organometallics, 1998, vol. 17, pp. 3460-3465.

Thomas, R. M. et al., "Thermally Stable, Latent Olefin Metathesis Catalysts," Organometallics, 2011, vol. 30, pp. 6713-6717.

Eivgi, O. et al., "Latent, Yet Highly Active Photoswitchable Olefin Metathesis Precatalysts Bearing Cyclic Alkyl Amino Carbene (CAAC)/Phosphite Ligands," ACS Catalyst, 2021, vol. 11, pp. 703-709.

Eivgi, O. et al., "Latent Ruthenium Benzylidene Phosphite Complexes for Visible-Light-Induced Olefin Metathesis," ACS Catalysis, 2020, vol. 10, pp. 2033-2038.

Vidavsky, Y. and Lemcoff, N. G., "Light-Induced Olefin Metathesis," Beilstein Journal of Organic Chemistry, 2010, vol. 6, pp. 1106-1119.

Eivgi, O. et al., "Photoactivation of Ruthenium Phosphite Complexes for Olefin Metathesis," ACS Catalysis, 2018, vol. 8, pp. 6413-6418.

Guidone, S. et al., "Ruthenium Indenylidene "1st generation" Olefin Metathesis Catalysts Containing Triisopropyl Phosphite," Beilstein Journal of Organic Chemistry, 2015, vol. 11, pp. 1520-1527.

* cited by examiner

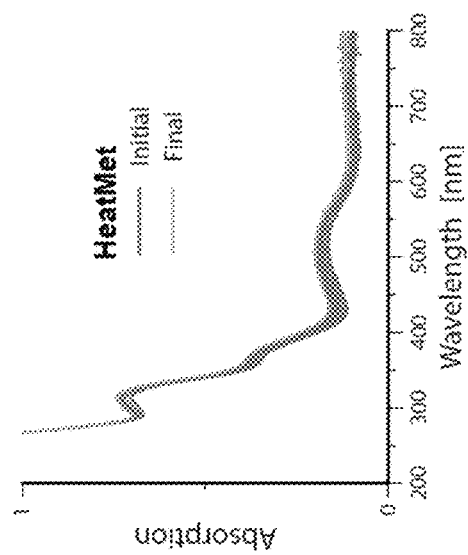
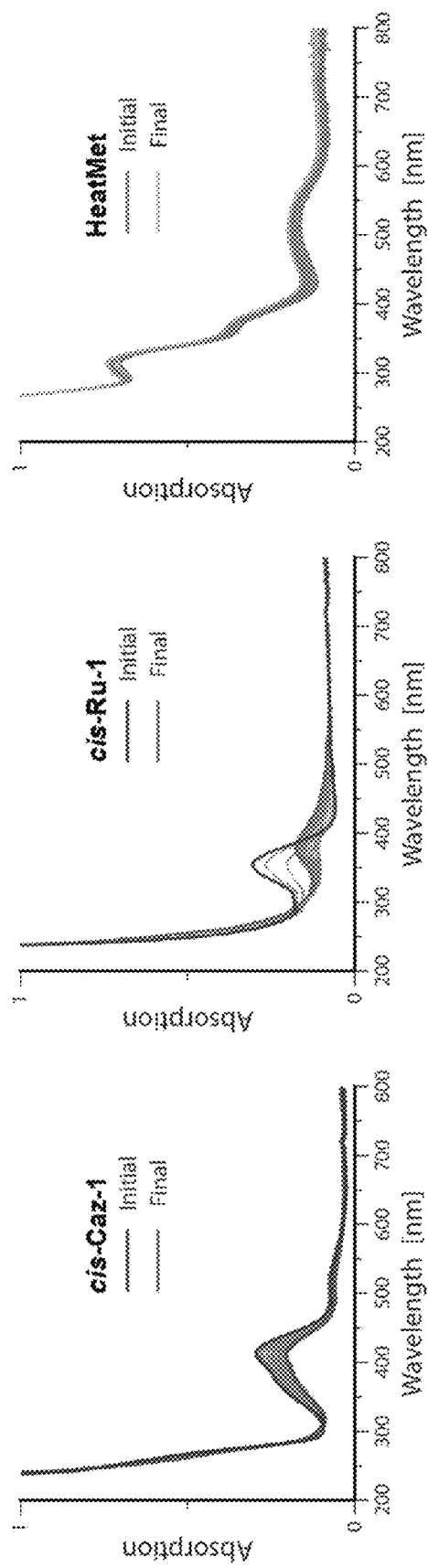
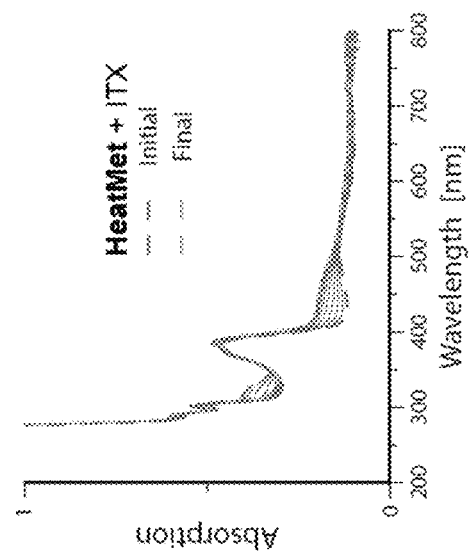
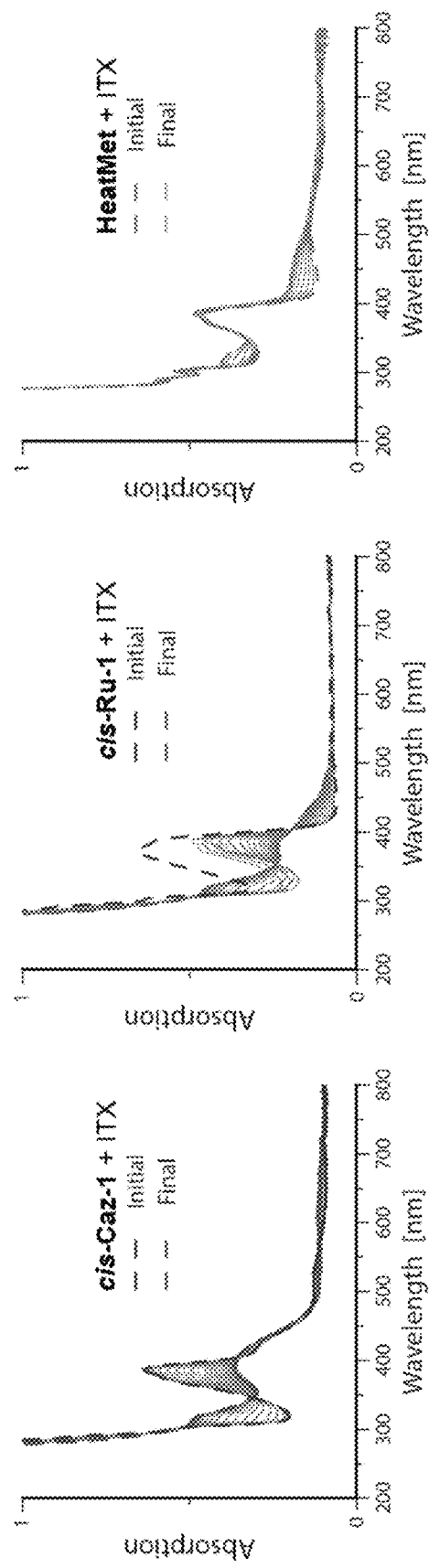
FIG. 8A  FIG. 8B  FIG. 8C  FIG. 8D  FIG. 8E  FIG. 8F

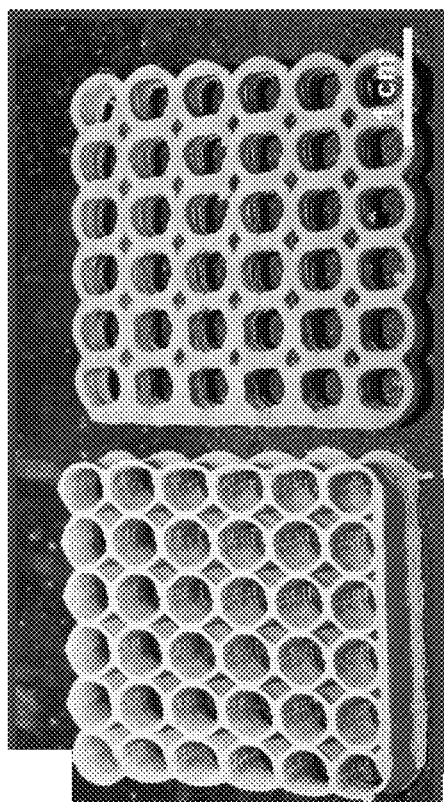
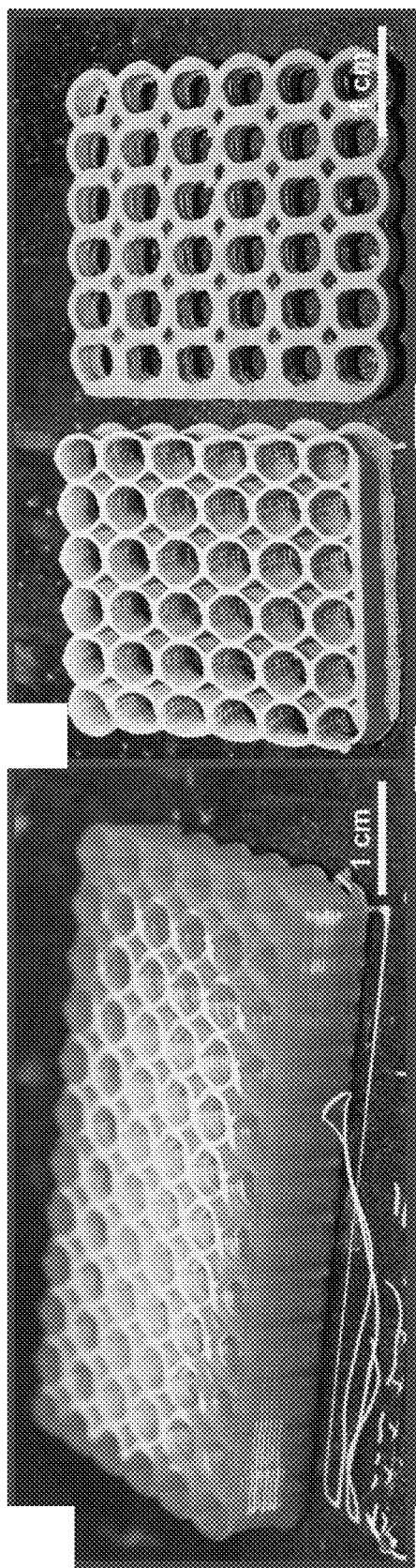
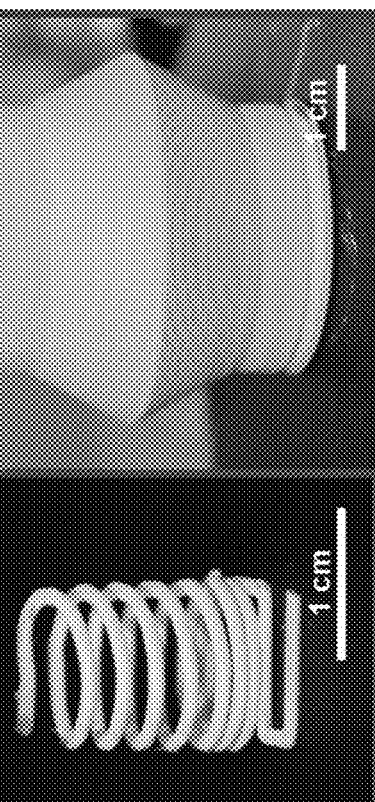
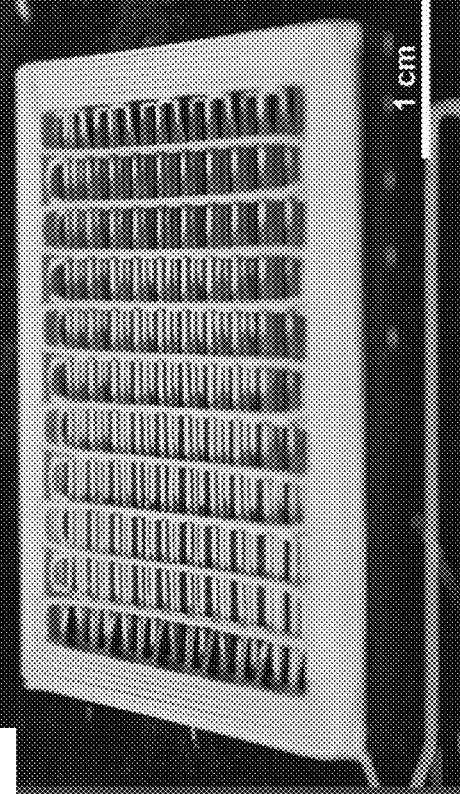
FIG. 10A  FIG. 10B  FIG. 10C  FIG. 10D  FIG. 10E

FIG. 12E
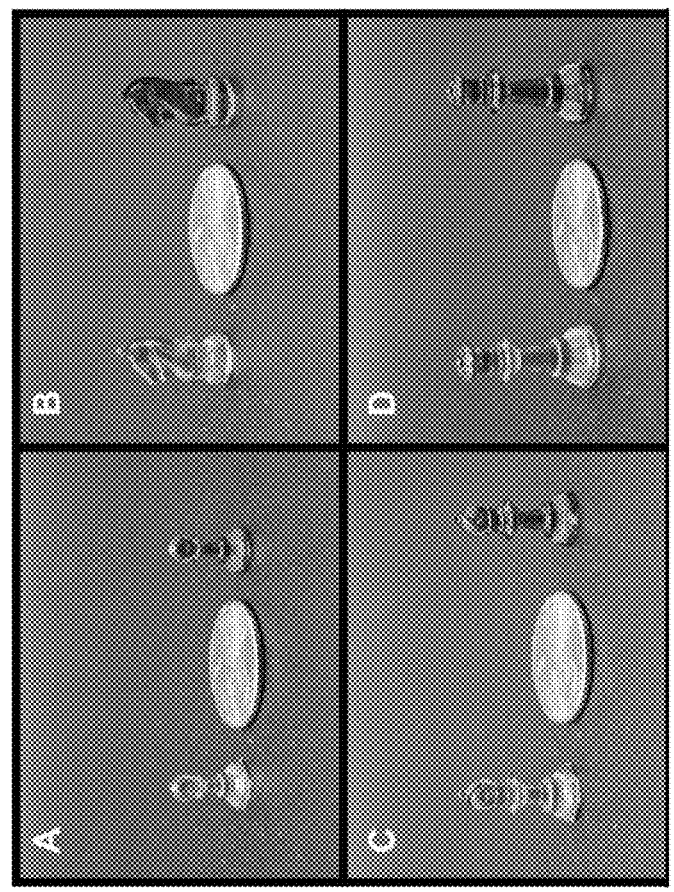
FIG. 12A  FIG. 12B
FIG. 12C  FIG. 12D

USE OF LATENT METATHESIS POLYMERIZATION SYSTEMS FOR ADDITIVE MANUFACTURING

CROSS-REFERENCE TO RELATED APPLICATION

This application claims the benefit of U.S. Provisional Application No. 63/158,138, filed Mar. 8, 2021, which is incorporated herein by reference.

STATEMENT OF GOVERNMENT INTEREST

This invention was made with Government support under Contract No. DE-NA0003525 awarded by the United States Department of Energy/National Nuclear Security Administration. The Government has certain rights in the invention.

STATEMENT REGARDING PRIOR DISCLOSURES BY THE INVENTOR OR A JOINT INVENTOR

The following disclosure is submitted under 35 U.S.C. 102(b)(1)(A): Samuel C. Leguizamon, Adam W. Cook, and Leah N. Appelhans, "Employing Photosensitizers for Rapid Olefin Metathesis Additive Manufacturing of Poly(dicyclopentadiene)," Chem. Mater. 33(24), 9677 (2021), which is incorporated herein by reference. The subject matter of this disclosure was conceived of or invented by the inventors named in this application.

FIELD OF THE INVENTION

The present invention relates to the application of latent olefin metathesis catalysts in combination with metathesis-active monomers or resins for additive manufacturing via ring opening metathesis polymerization.

BACKGROUND OF THE INVENTION

Additive manufacturing (AM) of thermoset materials has found broad applicability for a myriad of industries including aerospace, dental, energy storage, and sensors. See B. Wang et al., Adv. Compos. Hybrid Mater. 3(4), 462 (2020); Q. Liu et al., Int. J. Adv. Manuf. Technol. 29(3), 317 (2006); F. Zhang et al., Nano Energy 40, 418 (2017); L. J. Tan et al., Adv. Funct. Mater. 30(43), 2003062 (2020); and D. Lei et al., Mater. Horiz. 6(2), 394 (2019). While significant progress has been made in the AM of thermally cured thermosetting resins, the most widely used approach for AM of thermosets is photopolymerization, due to its ease of initiation, fine control over printing geometry, and rapid polymerization rates. See M. G. B. Odom et al., Carbon 120, 447 (2017); B. Wang et al., Manuf. Lett. 21, 1 (2019); I. D. Robertson et al., Nature 557(7704), 223 (2018); A. C. Uzcategui et al., Adv. Eng. Mater. 20(12), 1800876 (2018); M. Layani et al., Adv. Mater. 30(41), 1706344 (2018); and G. Taormina et al., J. Appl. Biomater. Funct. Mater. 16(3), 151 (2018). However, the majority of methods utilizing in situ cure utilize radical or cationic polymerizations restricting attainable material properties. See S. C. Ligon et al., Chem. Rev. 117(15), 10212 (2017); P. Xiao et al., Prog. Polym. Sci. 41, 32 (2015); and A. Bagheri and J. Jin, ACS Appl. Polym. Mater. 1(4), 593 (2019).

Recently a number of groups have investigated AM approaches to thermoset resins polymerized by ring opening metathesis polymerization (ROMP). In their ongoing studies, Moore and colleagues demonstrated the potential for frontal ring opening metathesis polymerization (FROMP), a process in which the exotherm of the initial reaction induces a propagating polymerization front, to be used in the direct-ink write (DIW) AM of the metathesis-active dicyclopentadiene (DCPD) monomer, which forms a crosslinked thermoset network. See I. D. Robertson et al., ACS Macro Lett. 6(6), 609 (2017); B. A. Suslick et al., Macromolecules 54(11), 5117 (2021); L. M. Dean et al., ACS Appl. Polym. Mater. 2(11), 4690 (2020); K. J. Stawiasz et al., ACS Macro Lett. 9(11), 1563 (2020); and I. D. Robertson et al., Nature 557(7704), 223 (2018). To enable DIW printing, an inhibited DCPD resin is gelled prior to printing. For this AM process, FROMP is thermally initiated at the beginning of the print and the propagation rate is matched to the printer extrusion rate. The resulting polymer, polydicyclopentadiene (pDCPD), is a thermoset polymer with high impact strength, desirable chemical and thermal stability, and a high resistance to corrosion, and is used in protective shields, machinery, and recreational and heavy-vehicle applications. See S. Kovačič and C. Slugovc, Mater. Chem. Front. 4(8), 2235 (2020); and J. C. Mol, J. Mol. Catal. A Chem. 213(1), 39 (2004).

The use of metathesis-active monomers as resins and ROMP as a polymerization technique marks an important advance in the AM of thermoset resins. However, using FROMP, printing rates must match the rate of the propagating reactive front, inherently limiting the print speed. FROMP printing has been demonstrated at a print speed of 1.6 mm·s$^{-1}$ and the highest reported front propagation speed is 2.5 mm·s$^{-1}$. See I. D. Robertson et al., Nature 557(7704), 223 (2018); B. A. Suslick et al., Macromolecules 54(11), 5117 (2021); and A. Ruiu et al., J. Polym. Sci. A Polym. Chem. 52(19), 2776 (2014). While the rate of frontal polymerization can be improved by reducing inhibitor concentration, the process window for printing, or working time, is correspondingly reduced. See I. D. Robertson et al., ACS Macro Lett. 6(6), 609 (2017). Moreover, the printing demonstrated thus far has been limited to geometries without overlapping or adjacent layers—possibly because contact with another layer affects the propagation of the thermal front.

Alternatively, photochemically initiated ROMP, or photo-ROMP, provides a promising alternative to FROMP in which the initiation and the rate of polymerization can be controlled by catalyst selection and irradiation intensity, which could enable greater flexibility in varying print speeds and geometries. See C. Theunissen et al., J. Am. Chem. Soc. 141(17), 6791 (2019); and O. Eivgi et al., Acc. Chem. Res. 53(10), 2456 (2020). Additionally, photo-ROMP enables rapid integration with existing printer systems designed for photopolymerizable resins. Although extensive work has been conducted investigating photoinitiated ROMP; in general, research on the photo-ROMP of neat metathesis-active resins is sparse, due to catalyst instabilities or poor reactivities. See O. Eivgi et al., Acc. Chem. Res. 53(10), 2456 (2020); O. Eivgi et al., Synthesis 50(01), 49 (2018); W. Joo et al., J. Polym. Sci. A Polym. Chem. 57(17), 1791 (2019); B. K. Keitz et al., J. Am. Chem. Soc. 131(6), 2038 (2009); and J. Pinaud et al., Chem. Eur. J. 24(2), 337 (2018). Fortunately, recent work has developed ancillary ligands capable of superior photoactivation and has improved the latent stability of ruthenium catalysts for ROMP. See O. Eivgi et al., Acc. Chem. Res. 53(10), 2456 (2020); T. Ung et al., Organometallics 23(23), 5399 (2004); X. Bantreil et al., Chem. Commun. 46(38), 7115 (2010); C. Lexer et al., J. Organomet. Chem. 696(11), 2466 (2011). In particular, the Lemcoff group has produced a number of highly active photoinitiated ruthenium catalysts in the past three years and have demonstrated proof-of-concept layer-by-layer printing of several small structures. See O. Eivgi et al., *ACS Catal.* 8(7), 6413 (2018); O. Eivgi et al., *ACS Catal.* 11(2), 703 (2021); O. Eivgi et al., *ACS Catal.* 10(3), 2033 (2020); and O. Eivgi et al., *Acc. Chem. Res.* 53(10), 2456 (2020). However, the 30-60 second exposure times required per layer highlight the relatively sluggish photopolymerization rates even these first-class catalysts achieve.

SUMMARY OF THE INVENTION

The present invention is directed to the additive manufacturing of thermosets with latent olefin metathesis catalysts. It allows for the additive manufacturing of structures by thermal- or photo-initiated ring-opening metathesis polymerization from metathesis-active resins. Furthermore, it enables the printing of dual-cure and composite materials.

The invention provides a resin composition for AM printing comprising a metathesis-active monomer and a latent metathesis catalyst or pre-catalyst, an optional photosensitizer, and optional filler materials wherein the resin remains latent until a photo or thermal stimulus is provided.

A DIW process uses a resin comprising a metathesis-active monomer and a latent metathesis catalyst such that cure of the printed resin is initiated with application of an external photo or thermal stimulus. The DIW process uses a printing strategy involving the extrusion of an uncured resin from a print head onto a surface. A directed light source, such as a light-emitting diode, or a directed heat gun, photo or thermally activates the latent metathesis catalyst, initiating ROMP of the printed resin. Additionally, the invention provides for the use of a photosensitizer or photosensitizers to increase the rate of initiation, thereby enabling rapid printing of structurally stable objects. Optionally, a post cure can be used to ensure complete conversion of monomer and consolidation across printed interfaces.

Alternatively, the process can use a stereolithographic (SLA) printing strategy involving the projection of images into a vat of resin using a directed or patterned light source to photo-initiate the latent metathesis catalyst, initiating ROMP of the resin and enabling building a 3D object layer-by-layer. Optionally, a post cure ensures complete conversion of monomer and consolidation across printed interfaces. Additionally, the process can use a photosensitizer or photosensitizers to increase the rate of initiation enabling rapid printing of structurally stable objects.

Additionally, the invention provides a method for latent ROMP-based additive manufacturing of dual-cure thermoset resins, wherein the latently initiated ROMP polymer provides a rapid curing mechanism to maintain structure during AM printing and one or more additional non-metathesis-active monomers, such as homopolymerized epoxy resins, epoxy/amine resins, and epoxy/anhydride resins, can be cured by a non-ROMP mechanism post-print to provide a structurally stable object.

This invention also provides a method for AM of composite materials, comprising providing any of the above resin compositions in addition to reinforcing elements including but not limited to carbon fibers and other continuous or discrete fillers wherein the mixture forms a stable, latent resin, extruding the filled resin from a dispensing apparatus, and irradiating or thermally activating the latent catalyst, initiating a ring-opening metathesis polymerization, whereby a reinforced-thermoset polymer composite is printed.

As an example of the invention, rapid DIW AM of pDCPD was demonstrated using a photosensitizer/latent catalyst system to obtain unprecedented rates of photocatalyzed ROMP of DCPD (60 mm·s$^1$). Characterization of the resin system in situ shows the use of a photosensitizer decreased the induction period from 78.3 s to 3.6 s. The short induction period and rapid curing enables the DIW AM of geometrically-complex architectures and printing without the need for supports. In addition, the living nature of ROMP and high catalyst stability is leveraged to improve the adhesion between layers, a long-standing and prevalent issue in extrusion-based AM. Complex geometries have also been printed by SLA. The invention described herein can guide the development of rapid AM approaches for additional metathesis-active monomers and greatly expand the materials selection and performance properties achievable with additively manufactured thermoset resins.

BRIEF DESCRIPTION OF THE DRAWINGS

The detailed description will refer to the following drawings, wherein like elements are referred to by like numbers.

FIG. 7A is a graph of storage modulus of photo-ROMP mixtures with varying HeatMet loading but a constant ITX concentration of 0.5 mg ITX per 1 g of DCPD. FIG. 7B is a graph of storage modulus photo-ROMP mixtures with constant HeatMet loading but varying ITX concentrations. The HeatMet:ITX wt/wt ratio of 4:1 directly overlapped with 2:1 and is not shown. Photo-ROMP was initiated at 60 seconds by exposure to UV-light at 365 nm with an intensity of 120 mW·cm$^{-2}$. The start of the irradiation is noted by dashed purple lines.

FIGS. 8A-8F are graphs of in situ UV-Vis spectra of photo-active systems during UV-irradiated (365 nm) at an intensity of 120 mW·cm$^{-2}$ over 15 minutes. Spectra were taken at 48 second intervals. All spectra are normalized to 100% absorption. FIG. 8A shows spectra of cis-Caz-1. FIG. 8B shows spectra of cis-Ru-1. FIG. 8C shows spectra of HeatMet. FIG. 8D shows spectra of a solution of cis-Caz-1 and ITX. FIG. 8E shows spectra of a solution of cis-Ru-1 and ITX. FIG. 8F shows spectra of a solution of HeatMet and ITX.

FIGS. 10A-10E are photographs of parts fabricated from rapid DIW of photo-ROMP resins. All objects were printed using a 0.41 mm inner diameter nozzle unless otherwise specified. FIG. 10A is a photograph of a square close-packed cylindrical array using a 0.41 mm inner diameter nozzle, as printed. FIG. 10B is a photograph of square close-packed cylindrical arrays printed using 0.41 mm (left) and 0.61 mm (right) inner diameter nozzles and post cured with UV flood cure (left) and thermal cure (right). FIG. 10C is a photograph of a lattice printed fifteen minutes after resin preparation. FIG. 10D is a photograph of an unsupported spiral printed 14 hours after resin preparation. FIG. 10E is a photograph of a vase post-cured with UV-light.

FIG. 11A is a graph of storage modulus as a function of time for the photopolymerization of photo-ROMP resins initiated after 60 seconds by exposure to 365 nm light at various intensities to reach the given dosages. FIG. 11B is a graph of conversion versus time for the curing of photo-ROMP resins subjected to varying irradiation doses. Conversion was calculated using the 3140 cm$^{-1}$ absorbance peaks found in in situ FTIR spectra. FIG. 11C is a graph of tensile testing of molded and dogbones additively manufactures under various doss of UV-irradiation. FIG. 11D is a photograph of a vase printed prior to fracturing. FIG. 11E is a photograph of the vase after fracturing. FIG. 11F is a photograph of dogbones used for tensile testing.

FIGS. 12A-12D are photographs of stereolithography printed pDCPD chess pieces ((A) pawn, (B) knight, (C) bishop, and (D) queen) printed with either UltraCat/benzil/EDAB (left) or M220/benzophenone/EDAB (right) as catalyst/photosensitizer/co-initiator, using a 365 nm printer. The chess pieces were designed by Tetralite at MakerBot Thingiverse (https://www.thingiverse.com/thing:378322). FIG. 12E shows a benchmark 3D print, Benchy, printed using M220/benzophenone/EDAB as catalyst/photosensitizer/co-initiator system.

DETAILED DESCRIPTION OF THE INVENTION

The present invention is directed to the use of latent olefin metathesis catalysts in combination with metathesis-active monomers or resins for additive manufacturing, such as direct-ink write (DIW) and stereolithography (SLA), via ring-opening metathesis polymerization (ROMP).

Figure 1:
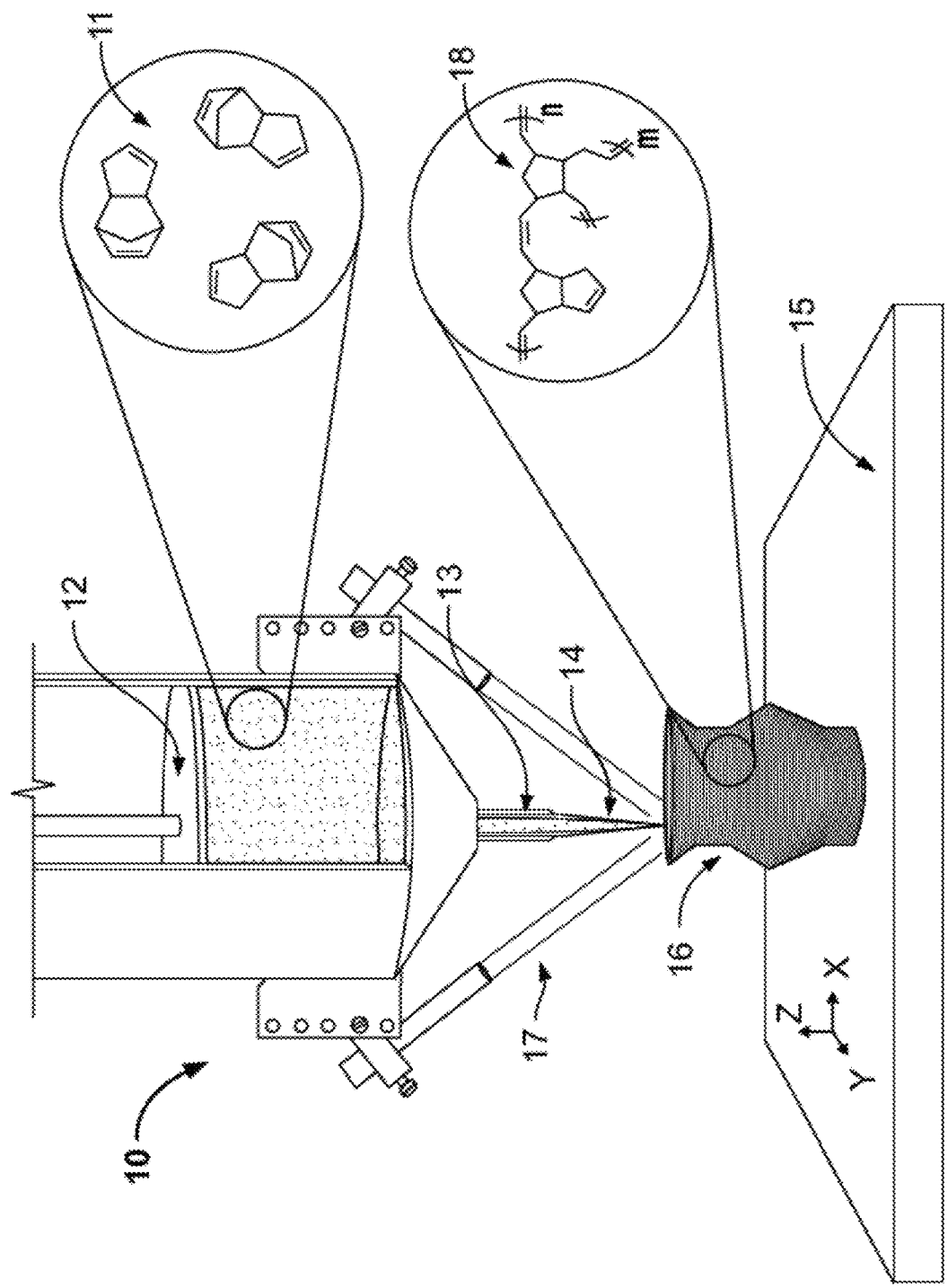
FIG. 1 as a schematic illustration of a DIW printing process.

As shown in FIG. 1, DIW is an extrusion-based AM process that can be used to fabricate meso- and micro-scale objects. In DIW, a liquid-phase "ink" 11, or resin, is extruded 12 out of a small nozzle 13 as a bead or filament 14 under controlled flow rates and deposited onto the surface of a platform 15. To build an object 16, the nozzle can be moved across the platform along digitally defined paths, or the platform can be scanned relative to a stationary nozzle, and directed irradiation of the deposited resin with light 17 or heat can photo or thermally initiate ROMP of the printed resin 18. The object 16 is thus built by printing the required shape layer-by-layer.

The general concept of latent metathesis polymerization can also be used with AM processes other than DIW. For example, the method can be used for vat photopolymerization additive manufacturing, wherein the resin compromises a metathesis-active monomer and a latent metathesis catalyst. A printed object can be formed layer-by-layer through targeted exposure of the resin to light, thereby activating the latent catalyst to initiate the ring-opening metathesis polymerization of the metathesis-active monomer. As an example, SLA printing can be realized by irradiating a bath of the resin with targeted light exposure through photomasks or with focused UV light. For example, with the help of computer aided manufacturing or computer-aided design (CAM/CAD) software, a UV laser can be used to draw a pre-programmed design or shape by rastering the UV laser over the surface of the resin or by scanning the build platform under the stationary light source. The resin is photochemically solidified and forms a single layer of the desired 3D object. Then, the build platform lowers one layer and a blade recoats the top of the solidified layer with resin. This process is repeated for each layer of the build until the 3D object is complete. It is also possible to print objects "bottom up" by using a vat with a transparent bottom and focusing the UV light upward through the bottom of the vat.

ROMP is a type of olefin metathesis chain-growth polymerization. The driving force of the reaction is relief of ring strain in the cyclic olefin. The most common homogeneous catalysts for ROMP are Grubbs' catalysts. Grubbs catalysts comprise a series of transition metal carbene complexes that have excellent functional group tolerance, air-stability, and fast initiation and propagation rates. In addition to the Ru-based Grubbs catalysts described herein, there are also metathesis catalysts based on other transition metals, such as W, Mo, Re, and Ti. The approach described herein is unique from frontal ring opening polymerization (FROMP). In FROMP an inhibited catalyst system initiates a rapid polymerization by a point application of heat or light, and the propagation of polymerization is auto-catalyzed by its own exotherm. In the methods described herein latent catalysts are utilized, such that minimal polymerization occurs prior to activation. Furthermore, the polymerization, once initiated by heat or light, only continues to rapidly propagate by continued application of the initiating stimuli. The latent metathesis catalysts can include, but are not limited to, thermally latent catalysts that are initiated by application of temperature, photolatent catalysts that are activated by exposure to light, pH-latent catalysts where addition of an acid activates the catalyst, and redox-latent catalyst/pre-catalysts where an oxidant activates the catalyst or converts a pre-catalyst into an active catalyst. See Y. Vidavsky and N. G. Lemcoff, *Beilstein J. Org. Chem.* 6, 1106 (2010); and O. Eivgi et al., *ACS Catal.* 10, 2033 (2020).

Figure 2:
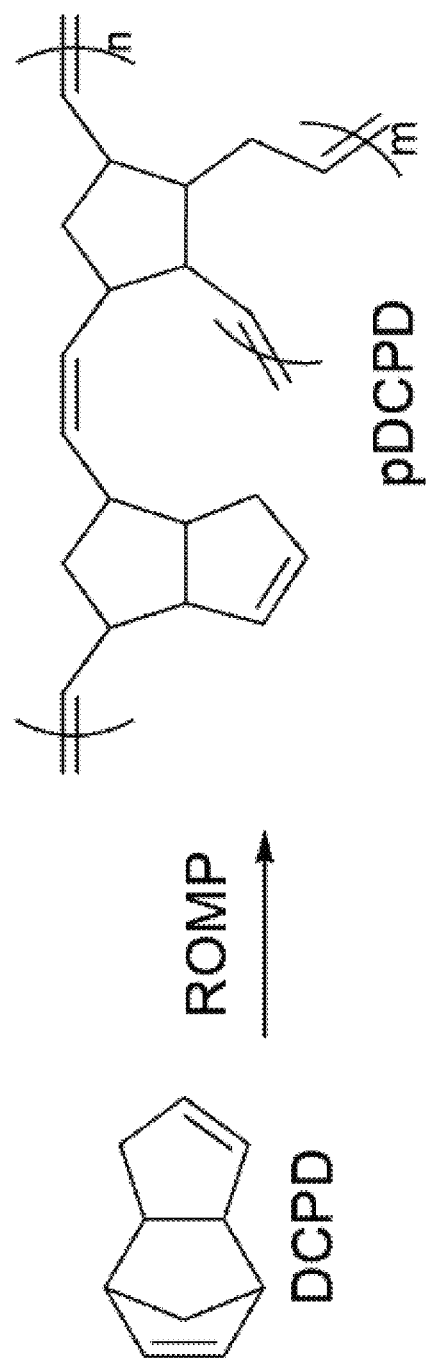
FIG. 2 illustrates the photocatalyzed ring-opening metathesis polymerization of dicyclopentadiene monomer to form polydicyclopentadiene.

FIG. 2 illustrates the photocatalyzed ROMP of the metathesis-active monomer dicyclopentadiene (DCPD) to form polydicyclopentadiene (pDCPD). For use in the exemplary DIW process, the metathesis-active monomer can be used as neat resins, filled resins or composites, or as a component of dual-cure resin systems. In dual-cure resins, one polymer network is formed while printing, in order to maintain the shape and structure of the print, followed by a second cure or network formation step which forms the final polymer network and develops the ultimate properties of the printed object. The resins and latent catalyst systems can also be used in combination with DIW continuous-fiber printing to produce additively manufactured continuous fiber composites. To ensure quality printing, the resin employed must be capable of extrusion from a nozzle under an applied force, while maintaining structural integrity upon exiting the print head. This is often achieved through addition of fillers or structure pinning by rapid curing of the resin. Rapid initiation rates and gelation times, while not required, are preferred as they enable increased printing and extrusion rates and can improve print fidelity by preventing deformation of the printed resin.

Pertinent metathesis-active monomers comprise cyclic olefins including, but not limited to, norbornadienes, norbornenes, oxonorbornenes, azanorbornenes, cyclobutenes, cyclooctenes, cyclooctadienes, cyclooctatetraenes, dicyclopentadiene, and derivatives thereof. DCPD, a by-product from naphtha crackers, can undergo ROMP to form a crosslinked thermoset polymer with high toughness and chemical resistance suitable for structural applications. Moreover, DCPD has recently been incorporated into an AM resin system with a non-latent, but inhibited, catalyst. See U.S. Publ. No. 20180327531 to Moore, "3d printing of thermoset polymers and composites." Therefore, DCPD was used as a monomer system for the examples described below. As DCPD is a solid at room temperature, ethylidene norbornene (ENB) can be added to provide a liquid DCPD/ENB composition. The use of a photosensitizer enables the reduction of the amount of relatively costly catalyst needed to achieve rapid polymerization.

In general, the invention includes, but is not limited to, the following classes and examples of latent metathesis catalysts or pre-catalysts. The resin can preferably comprise from about 0.01 to 1 mol % catalyst to monomer, and more preferably, from about 0.01 to 0.08 mol % catalyst.

(a) Photolatent catalysts where activation is achieved via irradiation by an external light source. HeatMet (dichloro(1,3-bis(2,4,6-trimethylphenyl)imidazolidin-2-ylidene){2-[(ethoxy-2-oxoethylidene)amino]benzylidene}ruthenium(II)) and Grubbs Catalysts® M220 (cis-Caz-1; cis-[1,3-Bis(2,4,6-trimethylphenyl)-2-imidazolidinylidene]dichloro(3-phenyl-1H-inden-1-ylidene)(triisopropylphosphite)ruthenium(II)) are examples of commercially available photolatent catalysts. Additional examples include the commercial [1,3-Bis(2,4,6-trimethylphenylimidazolidin-2-ylidene)](tricyclohexylphosphine)-(2-oxobenzylidene)ruthenium(II) chloride (LatMet) and others found in literature including, but not limited to, cis-PhosRu-1 and cis-Ru-4a. See O. Eivgi et al., *ACS Catal.* 8, 6413 (2018); and O. Eivgi et al., *ACS Catal.* 11, 703 (2021). Other commercially available catalysts include UltraCat (bis(1-(2,6-diethylphenyl)-3,5,5-trimethyl-3-phenylpyrrolidin-2-ylidene)dichloro(3-phenyl-1H-inden-1-ylidene)ruthenium(II)), HeatMet SIPr ((1,3-bis(2,6-diisopropylphenyl)imidazolidin-2-ylidene)dichloro(2-((2-ethoxy-2-oxoethylidene)amino)benzylidene)ruthenium(II)), and Umicore Grubbs Catalysts® M102 (dichloro(benzlidene)bis(tricyclohexylphosphine)ruthenium(II)) and M202 (Dichloro[1,3-bis(2,4,6-trimethylphenyl)-2-imidazolidinylidene](3-phenyl-1H-inden-1-ylidene)(tricyclohexylphosphine)ruthenium(II)).

(b) Thermally latent catalysts where activation is achieved by an external thermal stimulus. Examples of thermally latent catalysts are described in S. Chang et al., *Organometallics* 17, 3460 (1998); and R. M. Thomas et al., *Organometallics* 30, 6713 (2011).

(c) Acid-latent catalysts where activation is achieved by addition of an acid, often via a photochemical mechanism. An example is [1,3-Bis(2,4,6-trimethylphenylimidazolidin-2-ylidene)(tricyclohexylphosphine)-(2-oxo-5-nitrobenzylidene)ruthenium(II) chloride (Nitro-LatMet). See U.S. Pat. No. 11,230,624, issued Jan. 25, 2022.

(d) Redox-latent catalysts or pre-catalysts where an oxidant is used to activate the catalyst, often via a photochemical mechanism. Pre-catalyst examples include, but are not limited to, Umicore Grubbs Catalysts® M80, M80a, and M80f.

Figure 3:
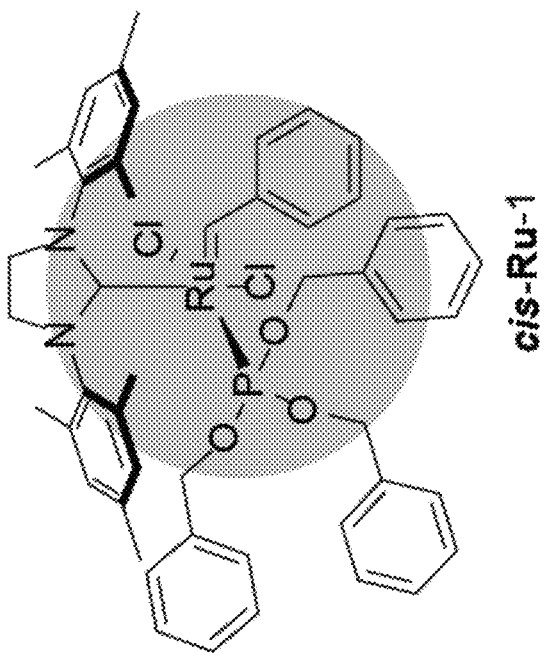
FIG. 3 illustrates commercially available ruthenium catalysts, cis-Caz-1 and HeatMet, and synthesized cis-Ru-1.
Figure 3:
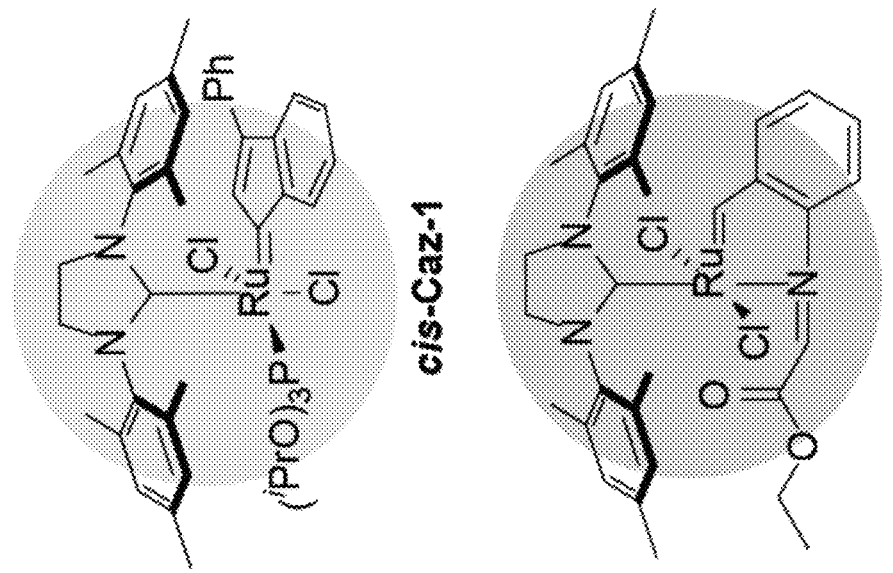

Although various photolatent catalysts are described in literature, two commercially available latent ruthenium catalysts were used herein as examples of the invention. Metathesis catalysts M220 and HeatMet were chosen due to their appreciable pot life, thermal latency, and recently identified photo latency. In addition, a synthetically-accessible photolatent catalyst, cis-Ru-1, was also explored. See O. Eivgi et al., *ACS Catal.* 10(3), 2033 (2020). These catalysts are illustrated in FIG. 3.

Figure 4:
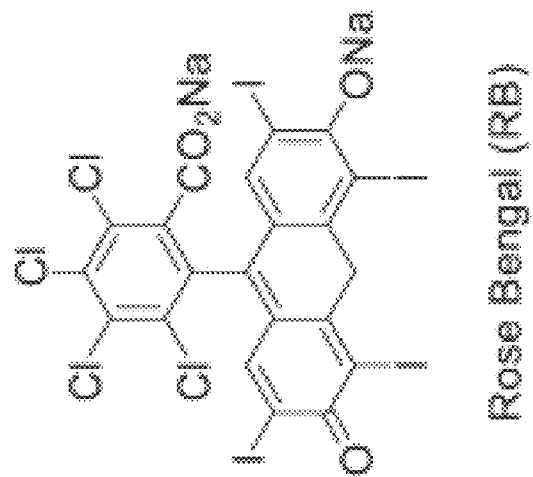
FIG. 4 illustrates photosensitizers isopropylthioxanthone (ITX), camphorquinone (CQ), and Rose Bengal (RB).
Figure 4:
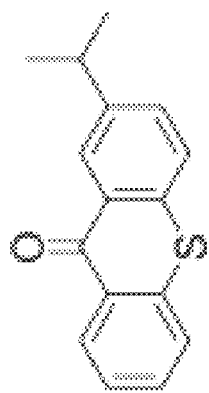
Figure 4:
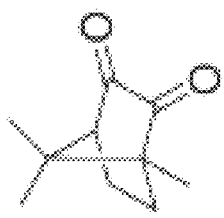

Photosensitizers are molecules that generate triplet excited states upon activation at a distinct wavelength. This energy can be passed on to another molecule to aid in the new molecule's activation and, as such, photosensitizers are commonly employed in photopolymerizations to increase initiation efficiency or provide alternative irradiation wavelengths. Therefore, photosensitizers can be used in the process to assist in the excitation of the ruthenium catalyst. The resin can typically comprise less than 3 wt % photosensitizer, for example, about 1:1 to 16:1 wt/wt catalyst to photosensitizer. Specifically, 2-isopropylthioxanthone (ITX) and camphorquinone (CQ), have been shown to improve the rate of initiation and propagation over a non-sensitized system. Other photosensitizers and dyes that can be used include, but are not limited to, benzophenone, phenothiazine, benzil, Rose Bengal (RB), rhodamine derivatives, and coumarins. These different photosensitizers, some of which are shown in FIG. 4, allow for multi-wavelength approaches to AM as each absorbs at different wavelengths.

Figure 5:
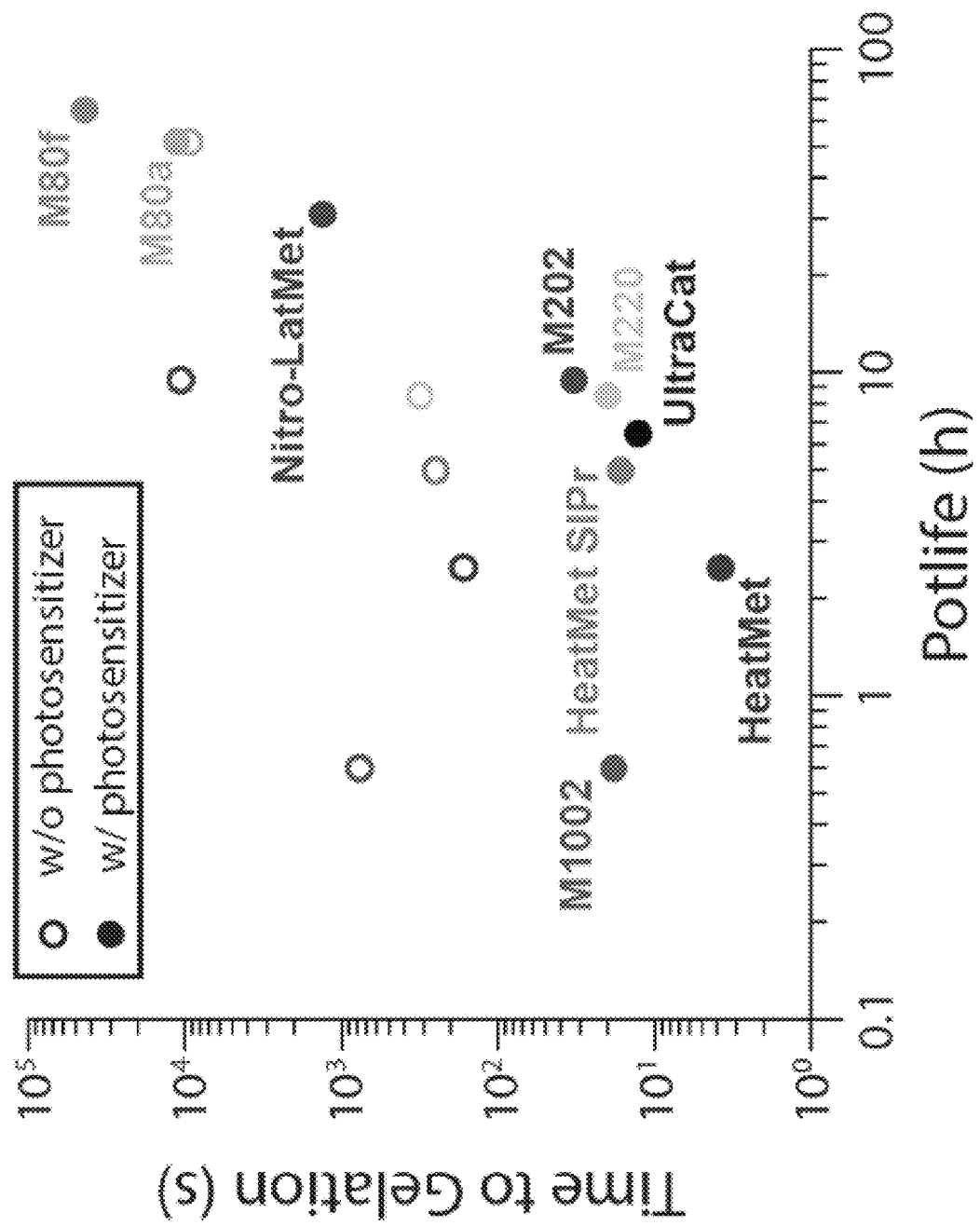
FIG. 5 is a graph of pot life v time to gelation under UV-irradiation (365 nm @ 17 mW cm$^2$) for resin mixtures comprising DCPD monomer and a variety of ruthenium catalysts, with and without ITX photosensitizer.

As described above, rapid initiation rates and gelation times are preferred as they enable increased printing and extrusion rates and can improve print fidelity by preventing deformation of the printed resin. FIG. 5 shows the pot life versus gelation time under UV-irradiation (365 nm @ 17 mW cm$^2$) for a resin mixture comprising DCPD monomer with a variety of ruthenium catalysts with and without ITX photosensitizer. Preferably, the resin mixture has a long pot life, but rapid gelation time. In most cases, the gelation time increases by an order of magnitude or more with the addition of the photosensitizer. In some cases, a co-initiator, such as ethyl 4-(dimethylamino)benzoate (EDAB) can be added to accelerate the rate of initiation of the photosensitizer.

DIW AM often uses shear-thinning resins so that the ink can flow and be extruded when pressure is applied but has higher zero-shear viscosity such that the extruded bead can retain its shape post print. As the DCPD/ENB resin mixture has a low viscosity, a conventional filler (e.g., silica) can be added to obtain shear-thinning properties. Other fillers include, but are not limited to, clays, fumed silicas, zirconates, aluminates, precipitated calcium carbonate, and natural or synthetic fibers. Moreover, a reinforcing filler can be included (e.g., carbon or glass fiber, carbon nanotube, inorganic fiber or filler, or organic or natural fiber or filler).

Dual-cure resins have been investigated as a means of increasing the final strength of printed materials. Epoxies typically generate robust polymeric materials; however, their reaction rates are often slow or, for more rapidly polymerizing monomers the mechanical properties are poor. Incorporating epoxy monomers into dual-cure printing resins affords relatively robust structures in situ while enabling strengthening of the printed product upon a post-cure of the incorporated epoxy monomers. While 3D-printing of dual-cure materials has been demonstrated with radical polymerization of monomers, such as acrylates, to date AM using ROMP for DCPD-containing dual-cure resins has not been demonstrated.

Thermally initiated non-ROMP systems can be used with dual-cure resins. Anhydride monomers for post-print polymerization of the epoxy network include, but are not limited to, nadic methyl anhydride, hexahydrophthalic anhydride, trimellitic anhydride, dodecenyl succinic anhydride, phthalic anhydride, and methyl hexahydrophthalic anhydride. Other examples of epoxy curing systems include, but are not limited to, epoxy-homopolymerization and amine-cured epoxies. However, as amines deactivate the ROMP catalyst, the use of amines as curing agents of the secondary epoxy network requires protecting groups orthogonal to the latent ROMP catalyst. For example, a photo-protected diamine can be used in tandem with a thermally latent ROMP catalyst.

While thermally initiated epoxy systems as the secondary polymer network are described above as dual-cure materials, photoinitiated systems with different initiation mechanisms with orthogonal wavelengths to the primary photo-initiated resin can also be used as the secondary network. These include, but are not limited to, free-radical acrylate systems (e.g., camphorquinone and bisphenol A diacrylate) and cationic/anionic polymerizations (e.g., iodonium salts and epoxies).

Thermal polymerization is also possible with some of the previously described photo-initiated resin systems, as some of the photolatent catalysts can also be thermally activated. Thus, DIW AM with these systems can also be achieved by either heating the print-bed or by using a directed heat gun that tracks the printing nozzle in a manner similar to the UV-waveguides.

Redox-activated polymerization is also possible with these systems using thermal- or photo-latent oxidation catalysts.

Example: DIW Photo-ROMP of DCPD Resins

As an example of the invention, dramatically improved photoactivity of latent metathesis catalysts was demonstrated by utilizing a novel photosensitizer/catalyst system. A commercial thermolatent catalyst, HeatMet, was photoinitiated and catalyzed the photo-ROMP of DCPD with rates rivaling both commercial and custom-synthesized photolatent ROMP catalysts. Utilizing an optimized photo-ROMP system, the rapid AM of complex architectures with DCPD resins was demonstrated and the effect of UV intensity and exposure profile on interlayer adhesion and the mechanical performance of printed materials was investigated.

DIW Resin Development and Characterization

DCPD is a solid at room temperature; therefore, all DCPD resins used in this study included 5 wt % 5-ethylidene-2-norbornene (ENB) to depress the melting point and allow for facile processing. DCPD/ENB mixtures were generated by melting DCPD at 40-50° C. and mixing in a 95/5 wt/wt ratio with ENB. Three catalysts were used for assessing photo-ROMP: a well-known commercial thermo- and photolatent catalyst, Grubbs Catalyst® M220 (cis-Caz-1); a synthetically-accessible photolatent catalyst introduced by the Lemcoff group with high activity, cis-Ru-1; and a commercial thermolatent catalyst, HeatMet, as shown in FIG. 3. See S. Guidone et al., *Beilstein J. Org. Chem.* 11, 1520 (2015); and O. Eivgi et al., *ACS Catal.* 10(3), 2033 (2020). Each of these catalysts were also studied in combination with the photosensitizer, isopropylthioxanthone (ITX). Printing resins were formulated with a 0.02 mol % of catalyst to DCPD/ENB and a 2:1 w/w ratio of catalyst:ITX dissolved in a minimal amount of dichloromethane (DCM) for dissolution, unless otherwise specified. Parallel plate oscillatory UV-rheology was employed to assess catalyst activity and the evolution of print-relevant properties (i.e., gelation, modulus, vitrification, etc.) during photo-ROMP with continuous 365 nm irradiation (120 mW·cm$^2$). The extrusion nozzles used for printing had inner diameters of 0.41-0.61 mm, thus a gap of 0.5 mm was used for UV-rheology experiments to match the diameter of the extruded resin bead during printing.

The evolution of modulus during cure was similar for each catalyst with four regimes observed upon UV exposure. Initially, there was an induction period in which the storage and loss moduli remained below the measurement noise floor, attributable to either low catalyst activation or insufficient polymerization to cause a detectable change in modulus. The induction period was followed by a rapid rise in both loss and storage moduli as the polymer network grew and eventually gelled. The gelation regime was followed by a more gradual rise in moduli during the network formation regime as the network continued to form and crosslink. The final vitrification regime began with a second transition in which the increasing crosslink density results in a relatively rapid increase in modulus and the glass transition temperature ($T_g$). Vitrification then reduced monomer mobility and slowed further reaction such that the materials reached a plateau in both modulus and conversion.

Figure 6A:
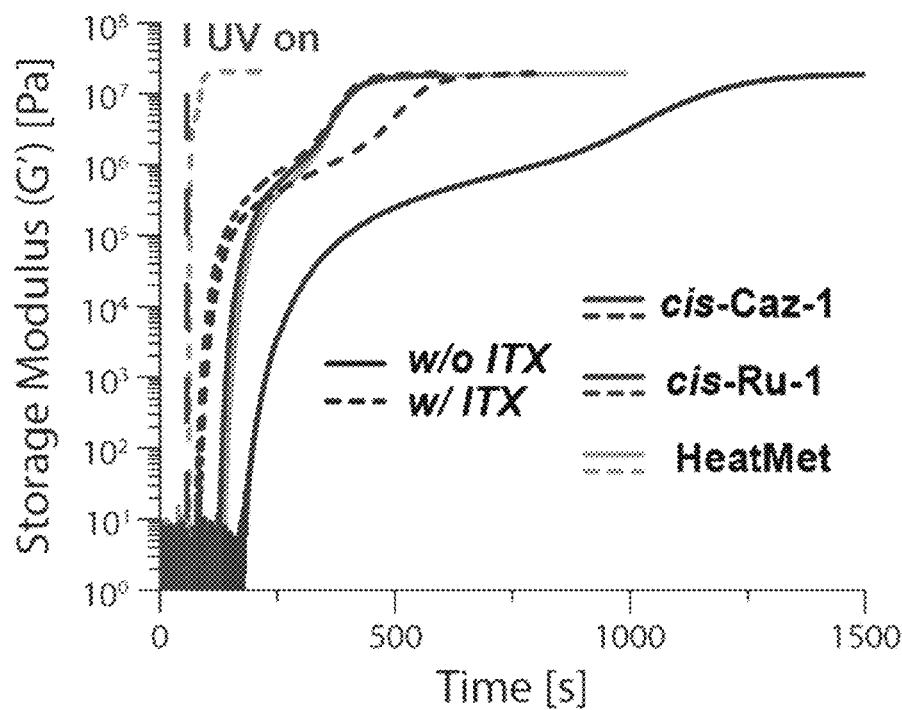
FIG. 6A is a graph of storage modulus during photo-curing of DCPD/ENB ROMP catalyzed by cis-Caz-1 (solid blue), cis-Ru-1 (solid green), HeatMet (solid orange), and each of the catalysts in combination with 0.5 wt equivalent ITX to ruthenium catalyst (0.02 mol %) (dashed lines).
Figure 6B:
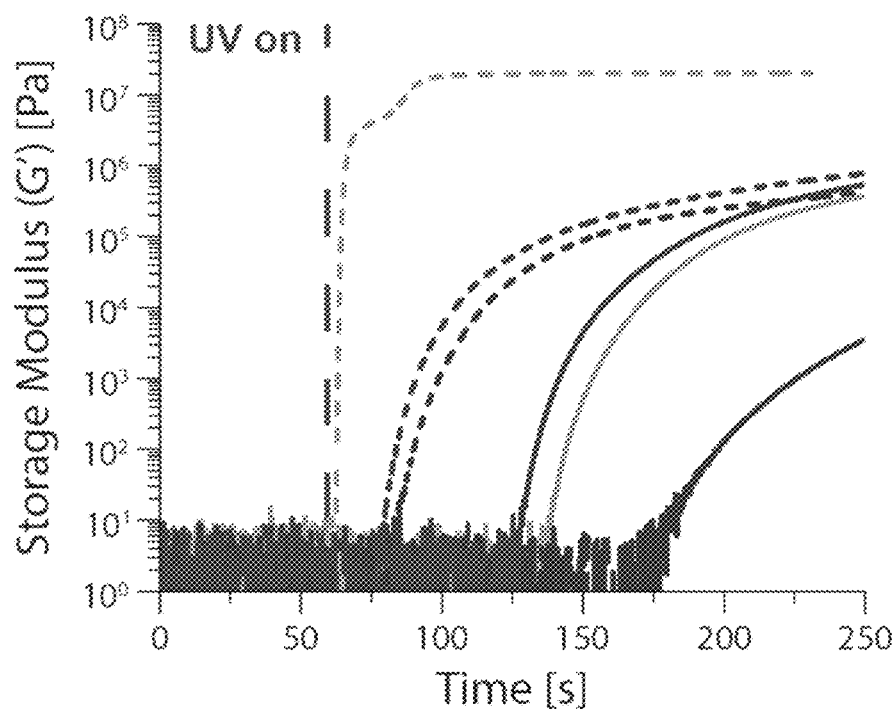
FIG. 6B is an expansion of the graph for the first three minutes of the photopolymerization. Continuous UV irradiation at 365 nm with an intensity of 120 mW·cm$^{-2}$ was initiated at 60 seconds, indicated by the vertical dashed purple line.

The UV-rheology of DCPD photopolymerizations catalyzed by cis-Caz-1, cis-Ru-1, or HeatMet without photosensitizer (FIGS. 6A and 6B, solid lines) revealed relatively long induction periods of 121.4, 68.1 and 78.3 s, respectively, after the light source was turned on. The gel points, as estimated by the storage and loss moduli crossover, followed the same trend, occurring at 137 s, 70.7 s, and 82.9 s after the start of irradiation. Cis-Caz-1 required the greatest amount of time for induction and gelation, followed by HeatMet and then cis-Ru-1. Surprisingly, although HeatMet has not been previously demonstrated as a photolatent catalyst, the photo-ROMP activity with HeatMet was comparable to that of cis-Ru-1, a catalyst designed specifically for high photocatalytic activity. The length of time between induction and gelation also followed the same trend (cis-Caz-1 slower than HeatMet slower than cis-Ru-1). This indicated that both the photoactivation kinetics and rates of polymerization differ for each catalyst, which is consistent with previous kinetic studies of ROMP and photo-ROMP. See M. G. Hyatt et al., *J. Am. Chem. Soc.* 141(44), 17918 (2019). Further mechanistic studies are necessary to fully elucidate the contributions of catalyst initiation, propagation kinetics, and rates of polymerization to the network formation and evolution of rheology in these systems, and to understand if, and how, initiation and propagation rates are affected by radiation intensity and duration.

Although all three catalysts were photoactive, their long induction periods would necessitate very slow printing rates in order to ensure that each area of the print was irradiated for an adequate duration to undergo the transition to the gelation/network formation regime, during which the network evolves sufficient mechanical strength to maintain a printed geometry. In an attempt to reduce induction periods, a strong photosensitizer, 2-isopropylthioxanthone (ITX), was added to the catalyst/resin mixtures. The addition of ITX (1:2 wt/wt vs catalyst) dramatically decreased both the photo-induction periods (cis-Caz-1:24.4 s, cis-Ru-1:19.2 s, and HeatMet:2.4 s) and the time to photo-induced gelation (cis-Caz-1:32.5 s, cis-Ru-1:25.0 s, and HeatMet:3.6 s) (FIGS. 6A and 6B, dashed lines), indicating higher rates of catalyst activation and rates of polymerization. Notably, HeatMet in combination with ITX was characterized by a gelation time of 3.6 s, approaching the rates of photoinitiated radical polymerizations. To confirm that ITX acted solely on the photo-catalyst and has no independent effect on the monomer, a mixture containing ITX but without catalyst was irradiated for 15 minutes and the rheological behavior measured. As anticipated, there was no measurable change in the storage or loss moduli, confirming the lack of network formation when exclusively using photosensitizer and monomer. To confirm that the polymerization was primarily photoinitiated and that heat transfer from the UV source did not play a significant role in initiating the catalyst a thermocouple was embedded into a mixture containing ITX, but no HeatMet, and showed only a 3° C. increase in temperature after 5 minutes of irradiation at 120 mW·cm$^{-2}$. Likewise, using an external infrared laser thermometer only a 1° C. temperature increase during irradiation was observed for DCPD resins containing HeatMet and ITX. These negligible increases in temperature suggest a predominantly photo-initiated mechanism, as opposed to a photo-thermal process. However, it is possible during the polymerization of larger volumes of resin that the heat of polymerization will generate enough thermal energy to initiate some thermal activation of HeatMet. Heating of the resin from the polymerization exotherm was observed during printing of the DCPD resins, as described in later sections, but was insufficient to sustain bulk polymerization in the absence of irradiation.

Figure 7A:
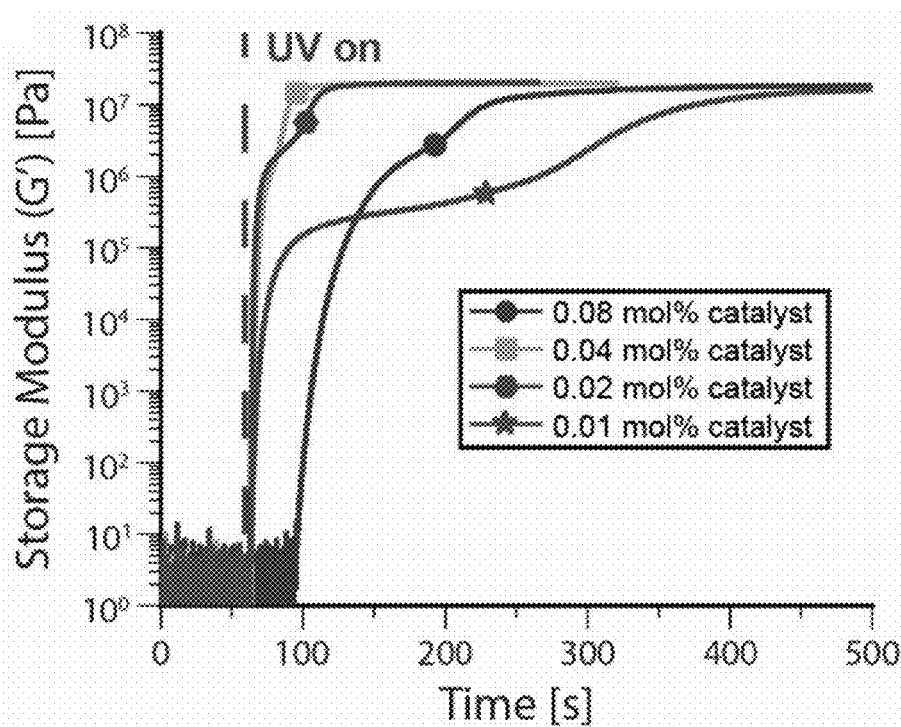
FIGS. 7A and 7B show photo-ROMP rate dependence on catalyst and photosensitizer concentration.
Figure 7B:
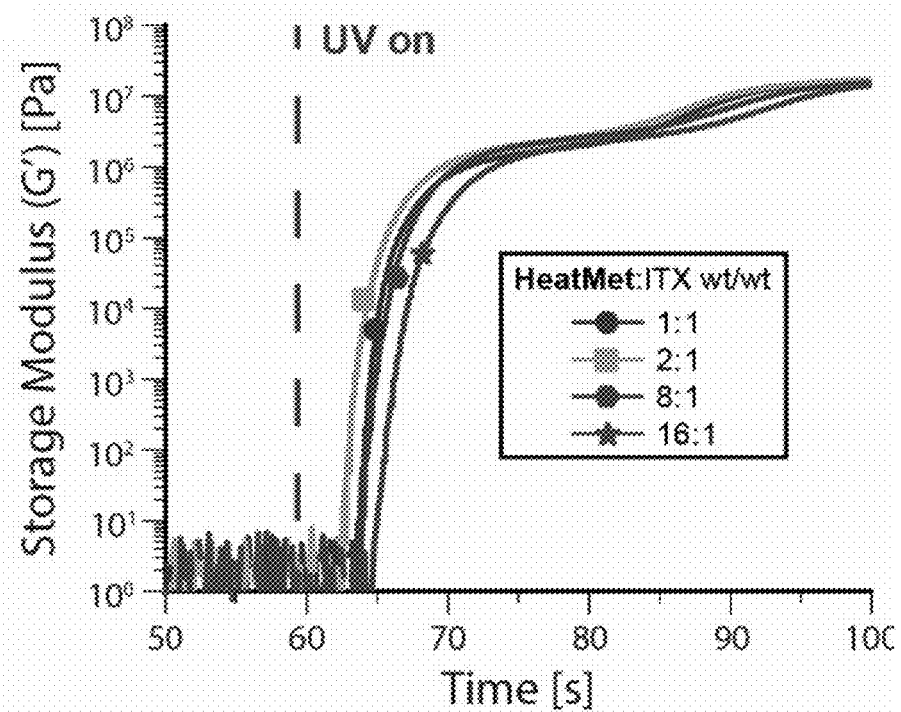

The effect of sensitizer and catalyst concentration on the rheological cure profile of DCPD polymerized by the Heat-Met/ITX catalyst system was further investigated, as shown in FIGS. 7A and 7B. Catalyst concentrations of 0.08 mol % vs DCPD and above resulted in longer induction periods, attributed to poor light penetration as the higher concentration of catalyst attenuated the light and decreased the penetration depth. Indeed, surface-limited curing was readily observed in UV-rheology samples of high HeatMet/ITX concentration when irradiated for short periods (i.e., before bulk polymer cure), in contrast to the homogenous cure observed at low HeatMet/ITX concentrations. At low concentrations of catalyst (≤0.01 mol %) rapid initiation was observed, but the initial increase in modulus was diminished and the network formation regime was greatly lengthened. This was expected as the polymerization rate is known to depend on catalyst concentration. See S. Guidone et al., *Beilstein J. Org. Chem.* 11, 1520 (2015). At the intermediate catalyst concentrations of 0.02 and 0.04 mol %, the reaction rate and modulus development were similar and provided the best performance. As such, a 0.02 mol % catalyst concentration was used for all further experiments. Interestingly, ITX concentration only moderately influenced reactivity with 4:1 (not shown) and 2:1 wt/wt HeatMet:ITX ratios yielding the maximum reactivity, as determined by the UV-rheology profiles (FIG. 7B). ITX addition had a much greater impact on the induction time and reaction kinetics for HeatMet than for cis-Ru-1. It was hypothesized that this could be due to the higher mol:mol ratio of ITX:HeatMet compared to ITX:cis-Ru-1, as ITX was added wt/wt versus catalyst rather than mol/mol. However, varying ITX concentration with cis-Ru-1 showed only moderate effects on reactivity and even with significantly higher ITX concentrations photo-ROMP with cis-Ru-1/ITX did not match the induction or gel times of the HeatMet/ITX system.

To better understand the effect of ITX on the catalyst systems, UV-vis spectroscopy was employed to measure the time-dependent absorbance of irradiated dilute solutions of catalyst, with and without ITX, as shown in FIGS. 8A-8F. All three catalysts had major absorption peaks centered at 365 nm, validating the use of 365 nm light for activation. A photo-response of cis-Caz-1 and cis-Ru-1 was evident by the disappearance of the peaks centered at 417 nm and 357 nm, respectively. Photolysis of cis-Ru-1 was accompanied by the appearance of a new absorbance band around 383 nm, absent in photolysis spectra of cis-Caz-1 and, thus, was likely attributable to the benzylphosphite ligand photoproducts. Interestingly, irradiation of solutions containing Heat-Met without ITX only exhibited subtle changes. A slight increase in the general absorbance over time was observed, with no significant peak shifts or changes in intensity of individual peaks. The intensity increase was therefore ascribed to gradual solvent evaporation over the course of the experiment rather than any photochemical reaction.

Further examination of the distinct activation methods of these catalysts can explain the observed photoresponses. Cis-Caz-1 and cis-Ru-1 are what Lemcoff et al. classify as "type I" latent catalysts. See O. Eivgi et al., *Acc. Chem. Res.* 53(10), 2456 (2020). Type I catalysts combine a phosphite ligand with a strongly σ-electron-donating ligand such that a stable cis confirmation is formed. Irradiation of these catalysts causes photoisomerization to a trans geometry, with dissociation of the phosphite ligand generating the active form of the catalyst. The isomerization and dissociation of the ligand both contribute to the large spectral shifts during photoactivation. The gradual decrease of the peak centered at 417 nm in the spectra of cis-Caz-1 over time compared with the rapid disappearance of the peak centered around 357 nm for cis-Ru-1 likely indicated a higher quantum efficiency for photoisomerization and ligand dissociation for cis-Ru-1 and correlates with the induction period trends seen in the characterization by UV-rheology and the greater activity previously reported for cis-Ru-1. See O. Eivgi et al., *ACS Catal.* 8(7), 6413 (2018); and O. Eivgi et al., *ACS Catal.* 10(3), 2033 (2020).

On the other hand, HeatMet falls into Lemcoff's type III class, which is characterized by the presence of a chelating Fischer carbene ligand and in which photoactivation takes place by an entropically disfavored decoordination of the chelating ligand. See O. Eivgi et al., *Acc. Chem. Res.* 53(10), 2456 (2020). With ligand dissociation highly disfavored, especially in the absence of a metathesis-active monomer to drive the equilibrium towards the activated catalyst form, the negligible changes in the absorption spectra under UV irradiation were expected. However, upon dissociation of the chelating ligand, the rate of propagation for type III catalysts is relatively rapid as the ligand does not compete with the metathesis monomer for a vacant coordination site, as is the case for the phosphite ligands of type I catalysts. See S. Kovačič and C. Slugovc, *Mater. Chem. Front.* 4(8), 2235 (2020). In an attempt to promote some photoactivation in the HeatMet solutions, the irradiation intensity was increased from 30 mW·cm$^{-2}$ to 120 mW·cm$^{-2}$. Under these conditions, a gradual disappearance of the peak centered at 313 nm was observed, which was attributed to the ligand dissociation.

The absorption spectrum of ITX ($\lambda_{max}$=387 nm) exhibited strong overlap with the absorption peaks of interest for each catalyst, complicating attempts to quantify data. Attempts to subtract out ITX absorption in accordance with the Beer-Lambert law for a two-component system yielded negative absorptions and indicated an interaction between the photosensitizer and catalyst in each system. This interaction was most clear in the absorbance spectra of irradiated solutions containing both HeatMet and ITX. For these samples, the characteristic ITX absorption peak at 387 nm was constant over time, whereas it decreased in irradiated solutions of ITX, and would be expected to decrease in these samples as well, if no interaction between photosensitizer and catalyst took place. Moreover, it was found that the irradiation of ITX alone or with cis-Caz-1 and cis-Ru-1 produced a photoproduct with an absorbance peak appearing at 318 nm, yet in the HeatMet/ITX solution there was a decrease in the absorbance at this wavelength. This decrease is attributable to the photolysis of HeatMet and further indicates a highly efficient energy transfer between HeatMet and ITX that corresponded to the efficient and rapid photo-ROMP of DCPD solutions as characterized by rheology. Given its outstanding performance for rapid photo-ROMP and commercial availability, HeatMet was used for further studies.

The final step in adapting these resins for DIW AM was to introduce a rheology modifier to increase the zero-shear viscosity and impart shear-thinning behavior to the resins. Shear-thinning resins are advantageous for DIW because the shear-thinning enables facile extrusion while a higher zero-shear viscosity improves shape retention of the printed bead immediately after extrusion in the short time prior to reaching a high enough modulus during in situ photocure. To increase the zero-shear viscosity and impart shear-thinning behavior, fumed silica (10 wt %, Cab-O-Sil® M-5) was incorporated into the DCPD resins. UV-rheology on the filled resins showed that the overall cure was slower in the presence of fumed silica. The final plateau modulus was reached after 750 s for the silica-filled resin compared to 125 s for the unfilled resin. Cure inhibition in the silica-filled resin may be due reduced light penetration or to adsorption of the catalyst onto the silica surface, decreasing the active catalyst concentration. However, the induction period of the filled resin and the initial rapid increase in modulus during the gelation regime were similar to those of the unfilled resin. Thus, despite the retardation of the overall cure rate, the silica-filled resins were suitable for DIW AM.

Figure 9A:
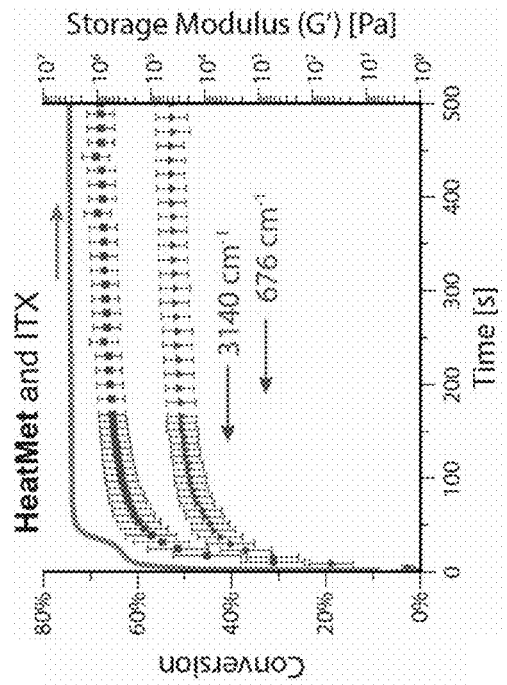
FIG. 9A is an illustration of DCPD with the norbornene (blue) and cyclopentene (green) double bonds assigned to the peaks at 3140 cm$^{-1}$ and 676 cm$^{-1}$, respectively.

To further investigate the effect of both the ITX photosensitizer and fumed silica on the photo-ROMP reaction, the DCPD/catalyst mixtures were also characterized using Fourier transform infrared (FTIR) spectroscopy with in situ UV irradiation. DCPD is composed of two distinct cyclic olefins—a highly-strained norbornene and a moderately-strained cyclopentene—capable of ROMP at disparate rates, as shown in FIG. 9A. However, there are few examples of conversion calculations using FTIR or Raman spectroscopy in the literature, and only a handful separate the conversion of the norbornene and cyclopentene moieties. See B. J. Rohde et al., *Polymer* 69, 204 (2015); S. E. Barnes et al., *Spectrochim. Acta A Mol. Biomol. Spectrosc.* 61(13), 2946 (2015); D. Schaubroeck et al., *J. Mol. Catal. A Chem.* 254(1), 180 (2006); and Q. Sun et al., *High Perform. Polym.* 29(8), 931 (2016). Moreover, the absorbance peaks identified for the cyclopentene double bond are generally convoluted by overlapping peaks, making it difficult to determine accurate conversions.

To identify peaks appropriate for quantitative conversion calculations, three DCPD-related cyclic olefin monomers were characterized in the mid-IR range; norbornene (NBE), 5-ethylidene-2-norbornene (ENB), and 5,6-dihydrodicyclopentadiene (DCPDH). Two peaks of high intensity, 3140 and 1573 cm$^{-1}$ were identified as belonging to the norbornene ring of DCPD, as evidenced by their presence in the spectra of ENB, DCPD, and norbornene, and absence in the spectra of the hydrogenated-norbornene monomer, DCPDH. The absorbance peak at 1573 cm$^{-1}$ has previously been assigned to the stretching vibration of the norbornene C=C—H bond, while the peak at 3140 cm$^{-1}$ is in the range ascribed to alkenes. See Q. Sun et al., *High Perform. Polym.* 29(8), 931 (2016). These two peaks exhibited similar time-dependent decrease in relative intensity during the photo-ROMP of DCPD mixtures suggesting they do indeed both follow the norbornene conversion. The peak at 3140 cm$^{-1}$ was better isolated and was used to provide the most accurate measurements of conversion for the norbornene ring conversion.

Similarly, peaks at 3211, 1614, and 676 cm$^{-1}$ were observed in spectra of the cyclopentene containing monomers (i.e., DCPD and hydrogenated DCPD), but not in spectra of NBE or ENB and thus were assigned to the cyclopentene ring. The peak around 1614 cm$^{-1}$ has been attributed to the stretching vibration of the cyclopentene ring; however, this peak and the alkene peak around 3211 cm$^{-1}$ had significant overlap with vibrational peaks of pDCPD, making deconvolution and accurate quantification of conversion difficult. See D. Schaubroeck et al., *J. Mol. Catal. A Chem.* 254(1), 180 (2006). In contrast, the peak at 676 cm$^{-1}$ was well isolated from other spectral features. Nevertheless, calculated conversion using the 676 cm$^{-1}$ peak matched conversions calculated using the other cyclopentene peaks, at 3211 and 1614 cm$^{-1}$, at early cure times, that is, before there is significant development of the overlapping peaks attributable to pDCPD). This confirmed that the peak at 676 cm$^{-1}$ was also tracking the cyclopentene alkene conversion; therefore, because of its greater spectral isolation, this peak was used to measure the conversion of the cyclopentene olefin during cure.

The conversion of photo-ROMP mixtures of DCPD with ITX, HeatMet only, HeatMet/ITX, and the HeatMet/ITX/silica printing resin were characterized by FTIR-spectroscopy during irradiation with 365 nm light at an intensity of 120 mW·cm$^{-2}$. The FTIR spectroscopy required the use of 0.076 mm thin films to prevent interference effects and total beam absorption. Because these films were significantly thinner than the samples previously used for the UV-rheology study, the UV rheology was repeated with 0.076 mm thick samples. This enabled determination of the correlation of conversion and rheological behavior for matching sample thicknesses. Additionally, irradiation of a control DCPD/ITX mixture produced no change in FTIR spectra after prolonged exposure, confirming the lack of reactivity between DCPD and ITX.

Figure 9B:
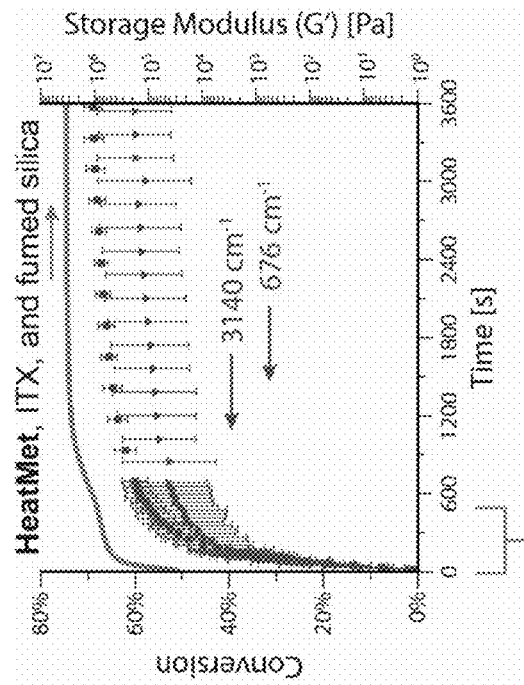
FIG. 9B is a graph of conversion versus time as characterized by in situ FTIR for photo-ROMP of DCPD with HeatMet.
Figure 9C:
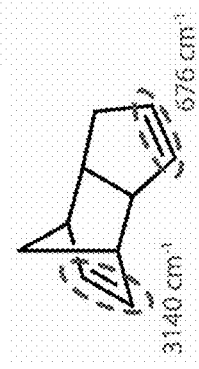
FIG. 9C is a similar graph for HeatMet and ITX.
Figure 9D:
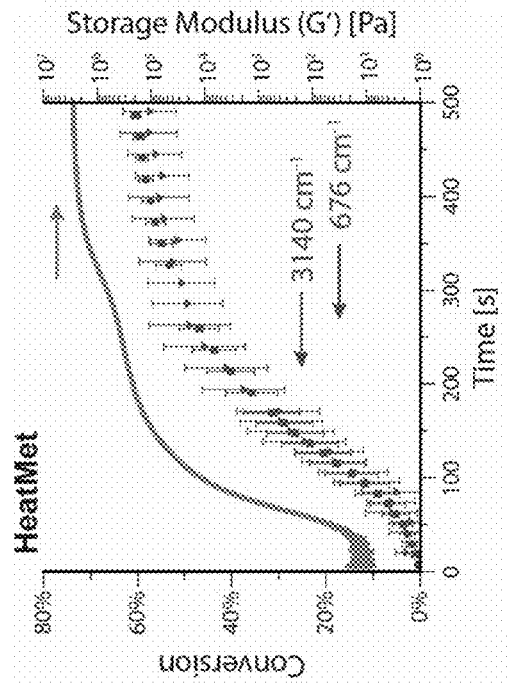
FIG. 9D is a similar graphs for HeatMet, ITX, and fumed silica. Plots show the norbornene (blue) and cyclopentene (green) moiety conversion and the storage modulus (orange) from UV rheology. Mixtures were reacted under continuous exposure to UV-light at 365 nm with an intensity of 120 mW·cm$^{-2}$.
Figure 9E:
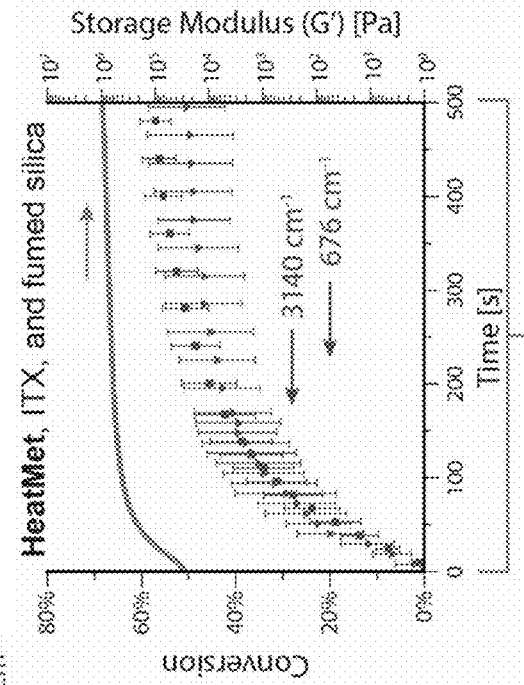
FIG. 9E is an expansion showing 3600 s of FIG. 9D. Error bars represent standard deviation. Reported conversions are an average of three to five runs.

The longer induction period observed in UV rheology for photo-ROMP with HeatMet only was likewise seen in FTIR. Similarly, the induction periods in FTIR were significantly shorter for both the HeatMet/ITX system and the HeatMet/ITX/silica system, also as seen in the UV rheology. Interestingly, the relative conversions of the norbornene and cyclopentene rings differed significantly between the different formulations. With HeatMet only, the cyclopentene ring conversion was quite similar to the norbornene conversion, with final conversions of 61.3±4.4% and 65.2±0.8%, respectively, as shown in FIG. 9B. In contrast, with HeatMet/ITX, norbornene conversion was markedly greater than that of cyclopentene (69.0±3.1% and 54.3±3.1%, respectively), as shown in FIG. 9C. The HeatMet/ITX/silica printing resin falls in between the two previous systems with 68.9±1.9% of norbornene and 60.7±7.6% of the cyclopentene olefins converted, as shown in FIGS. 9D and 9E. The silica-filled printing resin had higher variability in conversion between samples as compared with the unfilled resins. The higher variability in the filled resins may be due to dissimilar monomer evaporation between samples over the much longer polymerization time or inconsistent catalyst inhibition by silica. With all the catalyst systems, gelation occurred at a low conversion, which has been shown previously for ROMP of DCPD. See L. Matějka et al., *J. Appl. Polym. Sci.* 30(7), 2787 (1985). As expected, the rate of reaction of both the cyclopentene and norbornene rings also significantly decreased, and conversion reaches a plateau as vitrification occurred. Differential scanning calorimetry (DSC) was used to confirm the photocured conversions by comparing the exotherms during a ramped thermal cure in the DSC (without prior irradiation) to the exotherms from samples that were photocured prior to thermal cure in the DSC. The conversions of photocured samples determined by DSC generally matched those calculated by FTIR for each resin formulation: HeatMet only (73.7±14.6%), HeatMet/ITX (65.4±5.0%) and HeatMet/ITX/silica printing resin (77.1±14.8%).

Traditionally manufactured pDCPD materials are typically thermally post-cured to drive conversion to completion. To determine final conversions, the samples were thermally cured and characterized by FTIR spectroscopy. Samples were thermally cured, after UV irradiation, at 160° C. for either 2 or 4 hours. Further monomer consumption during the thermal cure can occur through additional metathesis, oxidation, or evaporation of the monomer. Poly(DCPD) also oxidizes relatively rapidly at elevated temperatures and the oxidation behavior has been studied in depth. See Q. Sun et al., *High Perform. Polym.* 29(8), 931 (2016); V. Defauchy et al., *Polym. Degrad. Stab.* 142, 169 (2017); J. Huang et al., *Polym. Degrad. Stab.* 166, 258 (2019); J. Huang et al., *Polym. Degrad. Stab.* 174, 109102 (2020); and E. Richaud et al., *Polym. Degrad. Stab.* 102, 95 (2014). Oxidation of the photocured samples upon thermal post-cure was evident by the appearance of a new peak assigned to the carbonyl (C=O) at 1650 cm$^{-1}$ in the FTIR spectra. See Q. Sun et al., *High Perform. Polym.* 29(8), 931 (2016); J. Huang et al., *Polym. Degrad. Stab.* 166, 258 (2019); J. Huang et al., *Polym. Degrad. Stab.* 174, 109102 (2020); and E. Richaud et al., *Polym. Degrad. Stab.* 102, 95 (2014).

A four-hour thermal post-cure lead to near complete disappearance of the monomer signals for each mixture, with an additional 30-35% reduction in the fitted peak area from photocured to final thermally-cured in the FTIR spectrum, emphasizing the need for thermal curing of any additively manufactured components. The glass transition temperatures ($T_g$) of samples prepared via photo-initiation with a thermal post-curing process (160° C. for 4 hours) were measured by DSC and dynamic mechanical analysis (DMA) to be 155 and 158° C., respectively. Samples that were only cured thermally (i.e., without photoinitiation) exhibited similar $T_g$ values. Efforts to characterize the $T_g$ of samples fabricated by photo-initiation but without a thermal post-cure were unsuccessful due to overlap with an exothermic event attributed to additional curing reactions, thereby obfuscating clear determination of $T_g$.

DIW AM

The rapid photocuring DCPD resin formulation was developed for use in DIW and for evaluation of photo-ROMP as a polymerization mechanism for in situ cure during printing. One important property of printing resins is the processing window (i.e., the time until the increase in resin viscosity prevents extrusion of the resin). Because the ROMP catalysts used are not perfectly latent, some activation and polymerization begins to occur as soon as the catalysts and DCPD are mixed. Resin pot life is often evaluated by measuring rheology evolution versus time, with the pot life being demarcated by different rheological characteristics (gelation, viscosity/modulus threshold, etc.) depending on the downstream processing requirements. The pot life was initially evaluated by measuring the time to gelation (moduli crossover) for each resin formulation under ambient conditions (i.e., without UV irradiation, except from ambient lab lighting). Each of the formulations gelled within 70 minutes. However, the gelation of the resin does not necessarily indicate the end of the processing window for DIW printing. In fact, as demonstrated by Robertson et al., gelation can actually improve the printability of a DCPD-based resin systems. See I. D. Robertson et al., *Nature* 557(7704), 223 (2018). To determine the processing window for actual printing, a different measurement was required.

The custom constant-volume extrusion DIW printer used for this research was equipped to measure the mechanical force required for the constant-volume extrusion of the DCPD resin. The in situ extrusion force measurement was used for direct evaluation of the process window. The extrusion force was measured for a freshly prepared resin, printed continuously for six hours. During printing, there was an initial drop in the extrusion force over the first 15 minutes as the resin shear thins and reached rheological equilibrium inside the syringe. After approximately two hours, a gradual increase in the extrusion force indicated the beginning of the gelation regime. This increase in extrusion force occurred at a significantly longer time than the gelation measured in the parallel plate rheology pot life experiment. The increased time to modulus increase seen when printing may be attributable to the reduced sensitivity to modulus changes of the printing instrument as compared with the rheometer. Additionally, the lack of head space in the syringe may limit evaporation of DCPD and ENB from the resin as opposed to samples between parallel plates where evaporation would cause an increase in concentration, thus accelerating the rate of gelation. Interestingly, resin aged for 18 hrs. in the syringe (without shear) could still be used for printing. This is significantly longer than the gelation time measured by UV rheology and also improved on the six hour process window for DIW printing of DCPD-based resins using FROMP. See I. D. Robertson et al., *Nature* 557(7704), 223 (2018).

Several architectures were chosen for printing to evaluate the use of the DCPD/HeatMet/ITX/silica system for UV-DIW: a simple cubic array of cylinders, a lattice, an unsupported spiral, and a vase, as shown in FIGS. 10A-10E. These geometries demonstrate the capacity of the DCPD resin to rapidly build architectures with fine features, sharp or round corners, unsupported segments, and large overhangs. An irradiation intensity of 300 mW·cm$^{-2}$ and a table speed of 20 mm·s$^{-1}$ were employed for all prints, unless otherwise specified. This print speed and intensity resulted in an approximate irradiation dose of 96 mJ·cm$^{-2}$, neglecting further UV exposures during printing of subsequent layers. Initial printing of the simple cubic array of cylinders employed 0.41 or 0.61 mm nozzle diameters to yield fine features at rapid extrusion rates (0.0033 and 0.0072 mL·s$^{-1}$, respectively), as shown in FIGS. 10A and 10B. Interestingly, after printing of the third layer in these structures, oxidation and a high degree of cure was observed towards the center of the array, as evidenced by the color transition of the printed material from light brown to white (FIG. 10A). The additional oxidation and cure were attributed to heat build-up from the large ROMP exotherm. However, the heat build-up was not sufficient to initiate cure in subsequent layers, if printed without irradiation, indicating that there was not sufficient heat to create a self-propagating polymerization front, as in the FROMP approach. Heat buildup in later prints was prevented by use of a cooling air stream and promoted more homogenous curing of the resin.

After printing, parts were additionally photocured with a 30 minute UV flood cure (120 mW·cm$^{-2}$) and then thermally cured at 160° C. for 4 hours. Interestingly, the simple cubic arrays of packed cylinders exhibited a high degree of shrinkage stress and substantial warping during the thermal post-cure. Using a gradual thermal cure profile did not mitigate the shrinkage or warping, with rapid shrinkage occurring as the temperature reached 100° C. This temperature coincides with the secondary exotherm observed in DSC scans of the photocured materials, suggesting that further crosslinking, and not monomer evaporation, which would be endothermic, largely cause the observed shrinkage. For application with architectures that will be susceptible to cure stress and warping, future work should examine the use of secondary stress-relieving monomers or blends, or alternative latent catalyst systems that reach higher conversion during the photocure.

To assess the resin's ability to from geometrically accurate and unsupported spanning features, lattice structures were printed with alternating perpendicular layers of struts. Each strut was spaced 3 mm from adjacent struts and a parameter shell was used to promote strut anchoring and lattice shape retention (FIG. 10C). Both spans and well-defined square corners were achieved with unsupported spans of the 3 mm gaps in each layer. However, sagging and ill-defined, rounded corners were observed where the struts contacted the outer shell and were attributable to the slight delamination of the bead adjacent to the shell as the print path turns between spanning struts.

Although supported features could be printed directly following resin preparation, unsupported features (e.g., spans) required rheological equilibrium to be reached for consistent printing (i.e., 15 minutes after resin preparation). Unsupported features were highly susceptible to flow anomalies during extrusion (e.g., clumped resin, poor silica mixing, etc.), which occur more frequently during the equilibration period. In addition to improved span performance after rheological equilibration, a notably improved capacity to span distances was also observed after aging the resin for an additional two or more hours (i.e., when the required extrusion force begins to increase). The partially formed network provided greater mechanical strength immediately after extrusion, while the photopolymerization is initiating. Resins printed 15 minutes after mixing consistently produced spans between 3 and 5 mm in length, while resins aged two or more hours could produce stable horizontal spans up to 100 mm in length. The use of aged resin is similar to the pre-gelation approach used by White et al., and, as in their work, the gelled resin was capable of free-form printing, also known as skywriting, and was employed to print free standing and unsupported spiral structures (FIG. 10D). See I. D. Robertson et al., Nature 557(7704), 223 (2018). Importantly, turning off the UV light while printing resulted in immediate sagging of subsequently extruded resin, with recovery of the structure when the UV light is turned back on. The on-off ability of this printing system further confirmed the absence of a FROMP mechanism and the importance of the UV initiated activation of the photolatent catalyst.

Vases with substantial overhangs are often employed as model architectures to evaluate novel resin systems. See V. C.-F. Li et al., Sci. Rep. 7(1), 8018 (2017). Overhangs can be difficult to achieve because they require both rapid cure, to prevent deformation and compression of the structure, and good interlayer adhesion, to enable vertical layers to adhere with only partial overlap of the bead diameters. To demonstrate the importance of the photocure in enabling printing of challenging architectures we printed a vase with two 33° overhangs. Without UV-irradiation, the vase maintained its shape initially but collapsed prior to the extrusion of the second overhang. In contrast, using a 20 mm·s$^{-1}$ table speed and a UV dose of 128 mJ·cm$^{-2}$ (intensity of 200 mW·cm$^{-2}$, FIG. 10E), a dimensionally accurate and mechanically stable vase could be printed. In contrast to the unsupported features of the printed lattices, the large overhangs in these relatively large vases (48 mm height×45 mm diameter) could be formed immediately after resin preparation.

Photochemical processes sometimes follow the 'reciprocity law,' where conversion is determined by UV dose regardless of exposure profile. See R. Bunsen and H. Roscoe, Ann. Phys. 193(12), 529 (1863); and R. H. Morgan, Radiology 42(5), 471 (1944). Therefore an exposure at low intensity for a long duration has the same result as an exposure at high intensity for a short duration. See L. Feng and B. I. Suh, Macromol. Chem. Phys. 208(3), 295 (2007); and J. W. Wydra et al., Dent. Mater. 30(6), 605 (2014). If the DCPD resins followed the reciprocity law, printing speeds could be further increased by proportionately increasing UV-irradiation intensity so that the dose remains equivalent. The reciprocity of the DCPD system was confirmed by comparing the rheological responses of three different doses, each achieved using three different exposure profiles (i.e., time and intensity of UV exposure). Rheological behavior was identical between exposure profiles for each of the doses. With reciprocity confirmed, vases were printed at higher speeds 40 and 60 mm·s$^{-1}$ by proportionately increasing the UV intensity to remain at an overall dose of 128 mJ·cm$^{-2}$.

Thermal post-cure did not result in observable stress-caused deformations of the vases. However, when attempting to remove vases printed at high intensities from the print bed after thermal cure, the layers of the vase separated, leaving the single bead path intact, thus producing a 'slinky' appearance (FIG. 11E). Poor interlayer adhesion is a common issue in AM, particularly in the z-direction, and warranted further investigation. See N. A. Nguyen et al., Appl. Mater. Today 12, 138 (2018). Although the living polymerization nature of ROMP and high catalyst stability provides a mechanism for improved interlayer strength through dark cure, whereby unreacted functional groups can react with a subsequent, overlapping layer even in the absence of irradiation, if the conversion at the surface of the printed beads is very high, there may not be enough unreacted functional groups or active polymer chain ends present to create sufficient linkages between layers. See N. A. Nguyen et al., Appl. Mater. Today 12, 138 (2018); and P. Striemann et al.,

*Polymers* 12(5), 1166 (2020). Many conventional polymerization mechanisms (e.g., radical photopolymerization) and extrusion techniques (e.g., FFF) can have weak interlayer adhesion due to the lack of interlayer polymerization or diffusion mechanisms to promote strong and homogeneous interfaces between the layers.

The effect of irradiation dose on mechanical properties and conversion was explored by printing vases with various UV doses; 50, 100, 150, 300 and 600 mJ·cm$^{-2}$ (FIGS. 11A and 11B) by altering irradiation intensity. The ideal UV dose is one that achieves the modulus needed to maintain the print geometry while limiting conversion so that interlayer polymerization can occur between consecutive layers. The vase printed with a dose of 50 mJ·cm$^{-2}$ lacked mechanical integrity and collapsed. In contrast, vases printed at doses of 100 and 150 mJ·cm$^{-2}$ were structurally stable, while vases at higher dosages (>300 mJ·cm$^{-2}$) resulted in failed prints as the resin cured at the tip of the nozzle and disrupted extrusion. Mechanically stressing the thermally post-cured vases printed at 50, 100, and 150 mJ·cm$^{-2}$ qualitatively revealed a decrease in interlayer strength with increased UV dose. The vase printed employing a 150 mJ·cm$^{-2}$ dose resulted in complete adhesive failure between layers and a 'slinky' appearance (FIG. 11E, far right). Mechanically stressing the vases printed at 50 mJ·cm$^{-2}$ and 100 mJ·cm$^{-2}$ resulted in cohesive-type failures that bridged multiple layers, demonstrating improved interlayer adhesion for these lower UV doses (FIG. 11E, left and middle).

Figure 11A:
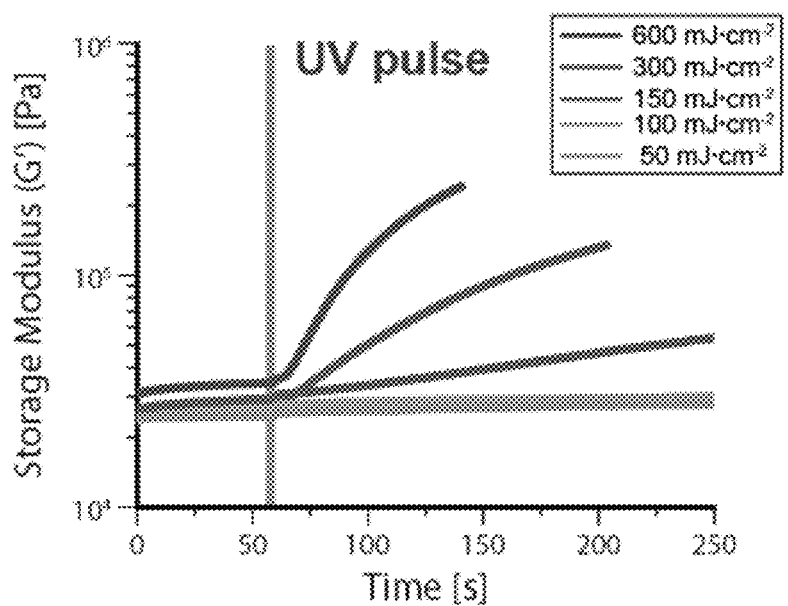
FIGS. 11A-11F illustrate the dose effect on the mechanical properties of additively manufactured parts using photo-ROMP resins.
Figure 11B:
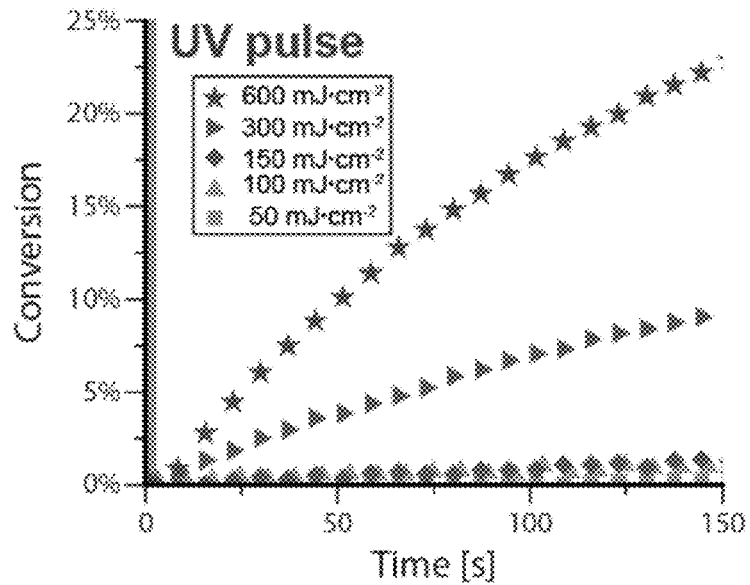
Figure 11C:
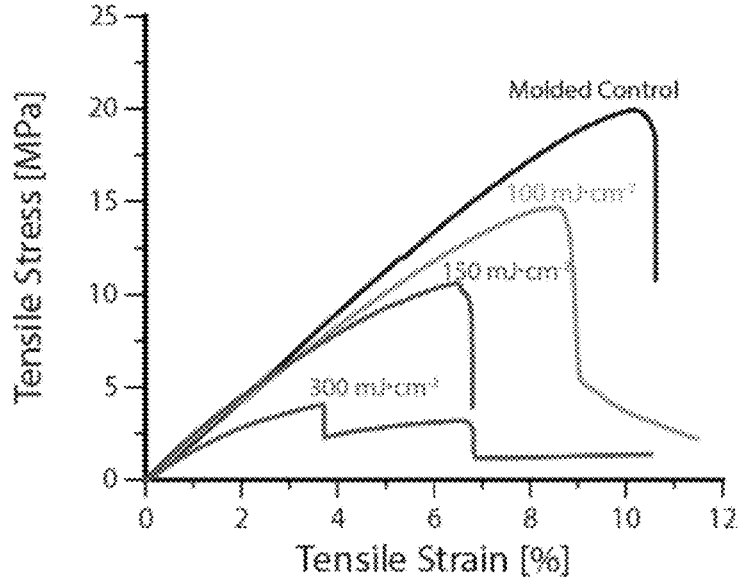
Figure 11D:
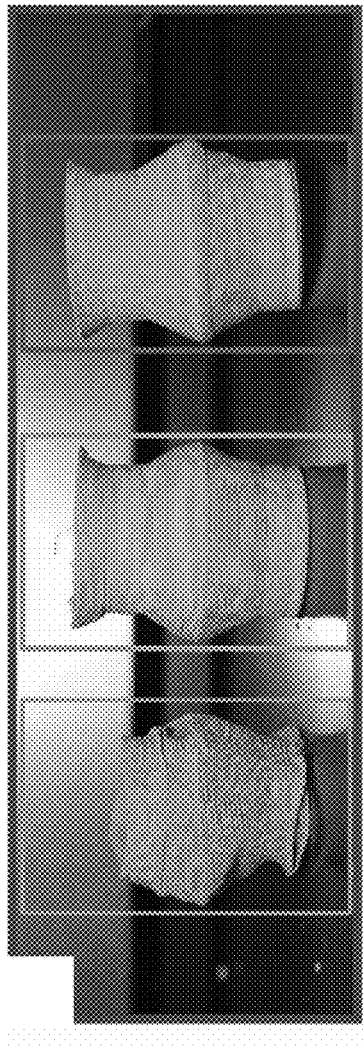
Figure 11E:
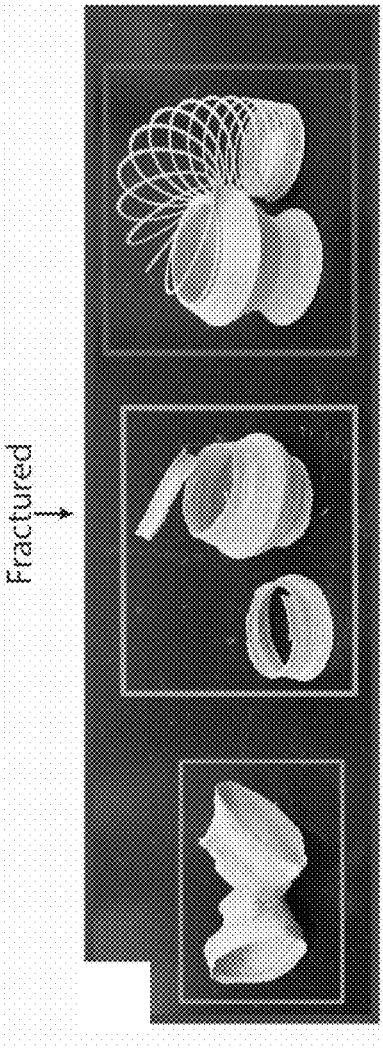
Figure 11F:
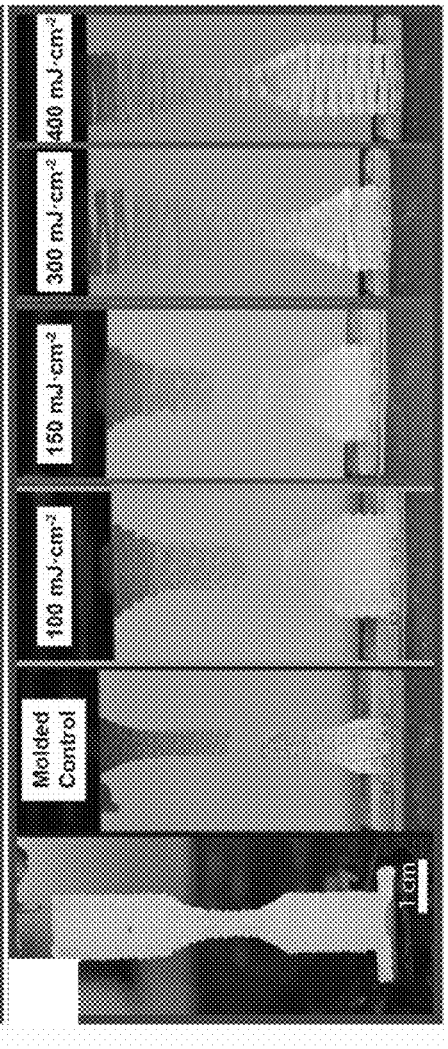

To quantify the effect of UV dose on the mechanical strength of printed components, dogbones were printed for tensile testing and compared with samples characterized by UV rheology and FTIR spectroscopy (on samples of thicknesses equivalent to printed bead diameter) (FIG. 11F). Dogbones were printed in a vertical orientation both to illustrate the ability to build extremely high aspect ratio architectures and to evaluate interlayer strength. For printing, dose was varied by keeping print speed constant (20 mm·s$^{-1}$) but changing the irradiation intensity. Conversely, for FTIR spectroscopy and UV rheology, the intensity of light was kept constant at 120 mW·cm$^{-2}$ while varying the exposure time to reach the target dosage.

The DCPD printing resin samples cured with a 50 mJ·cm$^{-2}$ (120 mW·cm$^{-2}$, 0.42 s) dose showed only a minimal increase in the storage modulus or tan $\delta$ when characterized by UV rheology (FIG. 11A). Likewise, FTIR at an identical dose (120 mW·cm$^{-2}$ for 0.42 seconds) showed negligible norbornene conversion (<0.5%). This low extent of conversion at a 50 mJ·cm$^{-2}$ dose did not provide the necessary mechanical integrity to support the printing of vertical dogbones, so no printed dogbone samples were tested for this dosage. Increasing the dosage to 100 and 150 mJ·cm$^{-2}$ showed moderate increase in conversions to ~1.25% and ~1.5%) and moduli over the materials printed with a 50 mJ·cm$^{-2}$ dose. In printing, the 100 and 150 mJ·cm$^{-2}$ doses successfully produced dogbones; however, roughly 50% of the time failure occurred during printing as instability in the base layers caused subsequent layers to print off-center. Further increasing the dose to 300 mJ·cm$^{-2}$ yielded significant conversion of norbornene (~9%) and rapid gelation. Printing with a dose of 300 mJ·cm$^{-2}$ resulted in successful dogbone formation every time. However, at higher dosages (i.e., ≥600 mJ·cm$^{-2}$), the rapid rate of photo-ROMP frequently caused the resin to cure to the nozzle and dislodged the printing dogbone from the print bed.

Although printing at 300 mJ·cm$^{-2}$ provided the highest yield of successful dogbones, their interlayer adhesion and those of dogbones printed at higher intensities, was poor as evident both visibly and in the tensile testing. Adhesive failures between individual layers coincided with rapid drops in the corresponding tensile stress as the print layers delaminated and the dogbones extended perpendicular to the build direction. In contrast, dogbones printed at 100 or 150 mJ·cm$^{-2}$ doses did not exhibit interlayer delamination under tensile stress. The 100 mJ·cm$^{-2}$ dogbone had markedly increased toughness with both a higher tensile stress and strain at failure. However, all printed dogbones showed a lower toughness compared with molded samples of similar formulation and cure profile. The lower toughness in the printed samples was attributed to the uneven surface of the dogbones, introducing surface defects that could act as failure initiation sites. See P. Zheng et al., *Fusion Eng. Des.* 161, 112006 (2020). The printed dogbones, which contain 10 wt % silica, also had significantly lower tensile stress and toughness than reported values for DCPD resin polymerized thermally using HeatMet. See S. J. Czarnocki et al., *ACS Catal.* 7(6), 4115 (2017). Further testing showed that the fumed silica used in the printing resin negatively impacted the mechanical performance. Samples prepared without fumed silica, using the HeatMet/ITX catalyst system and using the same photo and thermal cure profiles had an ultimate tensile strength of 46 MPa, matching the expected literature value for DCPD resin polymerized thermally using HeatMet.

In summary, a novel photoactivated DCPD resin system for DIW AM was developed. The use of a photosensitizer can significantly accelerate the rate of photo-ROMP to enable DIW AM printing. In addition, the commercial thermally latent ROMP catalyst, HeatMet, can be photoactivated with activity comparable to other reported, highly active photocatalysts such as cis-Ru-1 and cis-Caz-1. Using HeatMet and a photosensitizer enabled previously unattainable rates of photo-ROMP for neat DCPD resins and the rapid DIW of DCPD-based resin formulations. Several complex geometries were printed to demonstrate the capabilities of optimized DCPD resins to rapidly build architectures with fine features, sharp or round corners, and large overhangs at rates of up to 60 mm·s$^{-1}$. Additionally, allowing the resin to gel prior to printing enabled the printing of unsupported structures including a demonstration of a freestanding spiral and of spans up to 100 mm in length. Finally, optimizing exposure dosage to provide sufficient monomer conversion for mechanical integrity during printing while maintaining interlayer polymerization activity improved the interlayer strength and tensile performance of printed parts.

The ability to additively manufacture complex geometries using a rapid photo-ROMP mechanism is a crucial step towards the development of novel AM resins based on metathesis-active monomers that do not generate the large exotherms necessary for FROMP. Although DIW was used as a demonstration for the AM of DCPD resins, the system described herein could readily be applied to SLA printing. Given the excellent photoactivity, commercial reagents, and diversity in possible combinations of monomers, catalysts and sensitizers, the further use and development of photosensitizer/catalyst systems for photo-ROMP will greatly advance the broad fields of ROMP and AM in both industrial and academic settings.

Figure 13:
FIG. 13 photograph of a poly(DCPD) phoenix printed with UltraCat/benzil/EDAB as catalyst/photosensitizer/co-initiator. The Phoenix print was designed by Miguel Zavala at MyMiniFactory (https://www.myminifactory.com/users/mz4250)

As examples, FIGS. 12A-12D are photographs of SLA printed pDCPD chess pieces ((A) pawn, (B) knight, (C) bishop, and (D) queen) printed with either UltraCat/benzil/EDAB (left) or M220/benzophenone/EDAB (right) as catalyst/photosensitizer/co-initiator, using a 365 nm printer. FIG. 12E shows a benchmark 3D print, Benchy, printed using M220/benzophenone/EDAB as catalyst/photosensitizer/co-initiator system. FIG. 13 photograph of a poly (DCPD) phoenix printed with UltraCat/benzil/EDAB as catalyst/photosensitizer/co-initiator, demonstrating the high resolution and print fidelity achievable with the present invention.

The present invention has been described as use of latent metathesis polymerization systems for additive manufacturing. It will be understood that the above description is merely illustrative of the applications of the principles of the present invention, the scope of which is to be determined by the claims viewed in light of the specification. Other variants and modifications of the invention will be apparent to those of skill in the art.

We claim:

1. A resin for direct ink write additive manufacturing, comprising:
    a metathesis-active monomer;
    a latent metathesis catalyst that can be activated by an external stimulus to initiate a ring-opening metathesis polymerization (ROMP) of the metathesis-active monomer; and
    at least one filler that provides the resin with a shear-thinning property.

2. The resin of claim 1, wherein the metathesis-active monomer comprises a cyclic olefin.

3. The resin of claim 2, wherein the cyclic olefin comprises a norbornadiene, norbornene, oxonorbornene, azanorbornene, cyclobutene, cyclooctene, cyclooctadiene, cyclooctatetraene, dicyclopentadiene, or derivatives thereof.

4. The resin of claim 1, wherein the latent metathesis catalyst comprises a thermally latent, photolatent, or a redox-latent ROMP catalyst.

5. The resin of claim 4, wherein the latent metathesis catalyst comprises a ruthenium, tungsten, molybdenum, rhenium, or titanium catalyst.

6. The resin of claim 4, wherein the latent metathesis catalyst comprises a ruthenium-based Grubbs catalyst.

7. The resin of claim 1, wherein the resin comprises 0.01 to 1 mol % latent metathesis catalyst.

8. The resin of claim 1, wherein the resin comprises 0.01 to 0.08 mol % latent metathesis catalyst.

9. The resin of claim 1, further comprising at least one photosensitizer.

10. The resin of claim 9, wherein the at least one photosensitizer comprises isopropylthioxanthone, camphorquinone, benzophenone, phenothiazine, benzil, Rose Bengal, rhodamine, or coumarin.

11. The resin of claim 9, wherein the resin comprises less than 3 wt % photosensitizer.

12. The resin of claim 9, wherein the resin comprises 1:1 to 16:1 wt/wt latent metathesis catalyst to photosensitizer.

13. The resin of claim 9, further comprising a co-initiator that accelerates the rate of initiation of the photosensitizer.

14. The resin of claim 13, wherein the co-initiator comprises ethyl 4-(dimethylamino)benzoate.

15. The resin of claim 1, further comprising ethylidene norbornene.

16. The resin of claim 1, wherein the at least one filler comprises silica, clay, fumed silica, zirconate, aluminate, or precipitated calcium carbonate.

17. The resin of claim 1, wherein the at least one filler comprises a carbon or glass fiber, carbon nanotube, inorganic fiber or filler, or organic or natural fiber or filler.

18. The resin of claim 1, further comprising a non-metathesis-active monomer to provide a dual-cure resin, wherein the non-metathesis-active monomer can be polymerized post-print by a non-ROMP process.

19. The resin of claim 18, wherein the non-metathesis-active monomer comprises a thermally initiated monomer.

20. The resin of claim 19, wherein the thermally initiated monomer comprises an epoxy monomer.

21. The resin of claim 18, wherein the non-metathesis-active monomer comprises a photoinitiated monomer.

22. The resin of claim 21, wherein the photoinitiated monomer comprises a free-radical acrylate monomer or a cationic/anionic polymerizable monomer.

23. A method for direct-ink write additive manufacturing, comprising:
    providing the resin of claim 1 comprising a metathesis-active monomer and a latent metathesis catalyst;
    extruding the resin through a nozzle;
    depositing the extruded resin on a surface along a defined path;
    activating the latent metathesis catalyst using an external stimulus to initiate a ring-opening metathesis polymerization (ROMP) of the metathesis-active monomer of the deposited resin to provide a layer of polymerized resin; and
    printing a shape of polymerized resin layer-by-layer, thereby forming a printed object.

24. The method of claim 23, wherein the external stimulus comprises a thermal or photo stimulus.

25. The method of claim 23, further comprising post-print curing of the printed object.

26. A method for stereolithographic additive manufacturing, comprising
    irradiating a bath of the resin of claim 1 with a targeted light exposure, thereby activating the latent metathesis catalyst to initiate a ring-opening metathesis polymerization (ROMP) of the metathesis-active monomer and forming a layer of polymerized resin, and
    repeating the irradiating step to build a printed object layer-by-layer.

27. A method for additive manufacturing of dual-cure thermoset resins, comprising:
    providing a resin of claim 1, wherein the resin further comprises one or more non-metathesis-active monomers to provide a dual-cure resin;
    extruding the dual-cure resin from direct-ink write apparatus along a defined path; and
    photo or thermally activating the dual-cure resin, thereby initiating a latent ring-opening metathesis polymerization (ROMP) of the metathesis-active monomer, whereby a structure is printed layer-by-layer; and
    polymerizing the one or more non-metathesis-active monomers in the printed structure by a non-ROMP process to provide a printed object.

28. The method of claim 27, wherein the one or more non-metathesis-active monomers comprises a homopolymerized epoxy resin, an epoxy/amine resin, or an epoxy/anhydride resin.

29. The method of claim 27, wherein the one or more non-metathesis-active monomers comprises a free-radical acrylate monomer or a cationic/anionic polymerizable monomer.

* * * * *